United States Patent [19]
Yoshida

[11] Patent Number: 5,542,060
[45] Date of Patent: Jul. 30, 1996

[54] DATA PROCESSOR INCLUDING A DECODING UNIT FOR DECOMPOSING A MULTIFUNCTIONAL DATA TRANSFER INSTRUCTION INTO A PLURALITY OF CONTROL CODES

[75] Inventor: Toyohiko Yoshida, Itami, Japan

[73] Assignee: Mitsubishi Denki Kabushiki Kaisha, Tokyo, Japan

[21] Appl. No.: 432,334

[22] Filed: May 1, 1995

Related U.S. Application Data

[63] Continuation of Ser. No. 820,455, Jan. 13, 1992, abandoned.

[30] Foreign Application Priority Data

Jan. 21, 1991 [JP] Japan ..................................... 3-005230

[51] Int. Cl.$^6$ ...................................................... G06F 9/30
[52] U.S. Cl. ..................................... 395/375; 364/DIG. 1
[58] Field of Search ..................................... 395/375, 800

[56] References Cited

U.S. PATENT DOCUMENTS

| | | | |
|---|---|---|---|
| 4,454,578 | 6/1984 | Matsumoto et al. | 395/375 |
| 4,977,497 | 12/1990 | Sakamura et al. | 395/375 |
| 5,201,039 | 4/1993 | Sakamura | 395/375 |

OTHER PUBLICATIONS

"Computer Architecture A. Quantitative Approach", Hennessy et al, Morgan Kaufmann Publisher's Inc. 1990, pp. 208–215.

Primary Examiner—William M. Treat
Attorney, Agent, or Firm—Townsend and Townsend and Crew

[57] ABSTRACT

A data processor, comprises: an instruction decoding unit which decomposes both the instruction for loading plural data onto registers from a memory, and the instruction for storing plural data into the memory from the registers into plural internal codes; an instruction executing unit which is connected with an external memory through a data bus and executes the instruction; and an instruction execution control unit which controls execution of the instruction by the instruction executing unit, in accordance with respective internal codes outputted from the instruction decoding unit, and is capable of processing the instruction for loading plural data onto the register from the memory or storing into the memory from the register by one instruction at high efficiency, by executing decoding processing of the instruction decoding unit for outputting the internal codes, and instruction execution of the instruction executing unit in accordance with the internal codes outputted in an overlapping fashion with each other in accordance with the principle of pipelining.

2 Claims, 33 Drawing Sheets

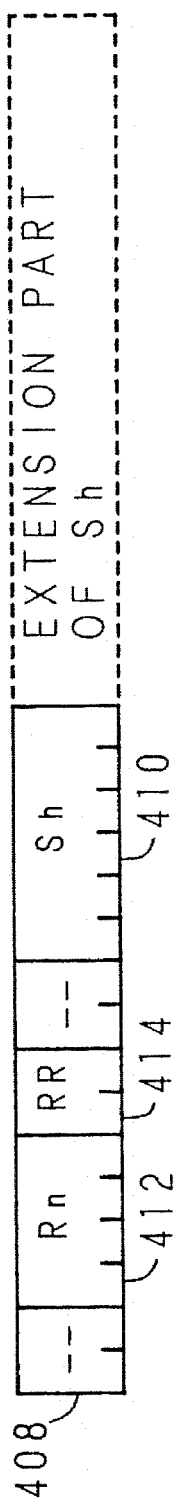
Fig. 3
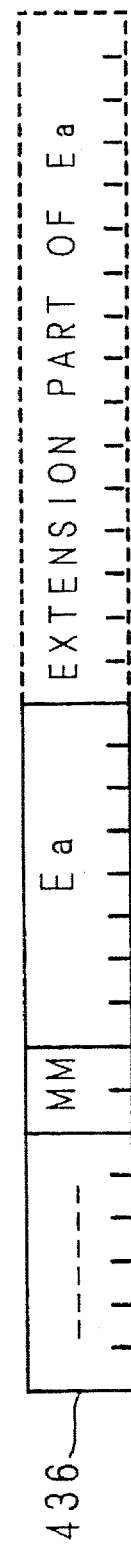
Fig. 4
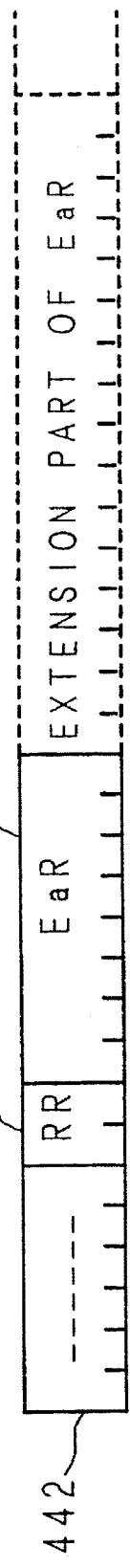
Fig. 5
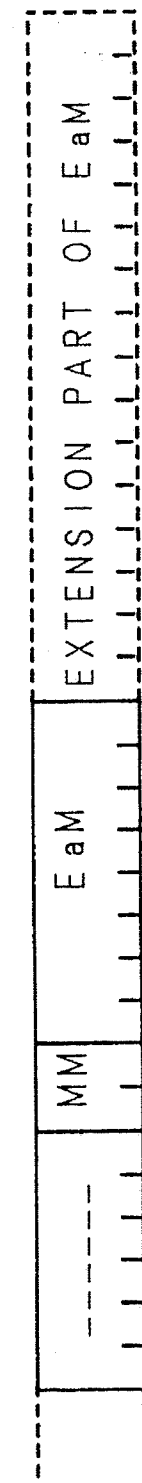

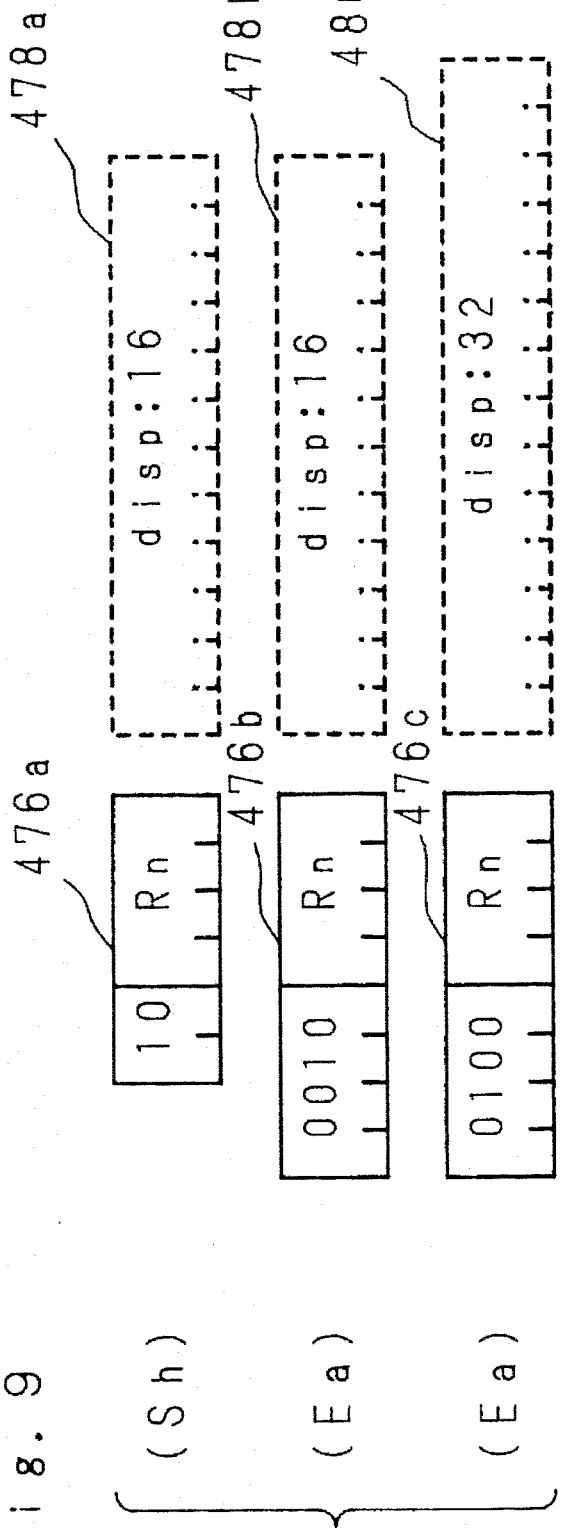
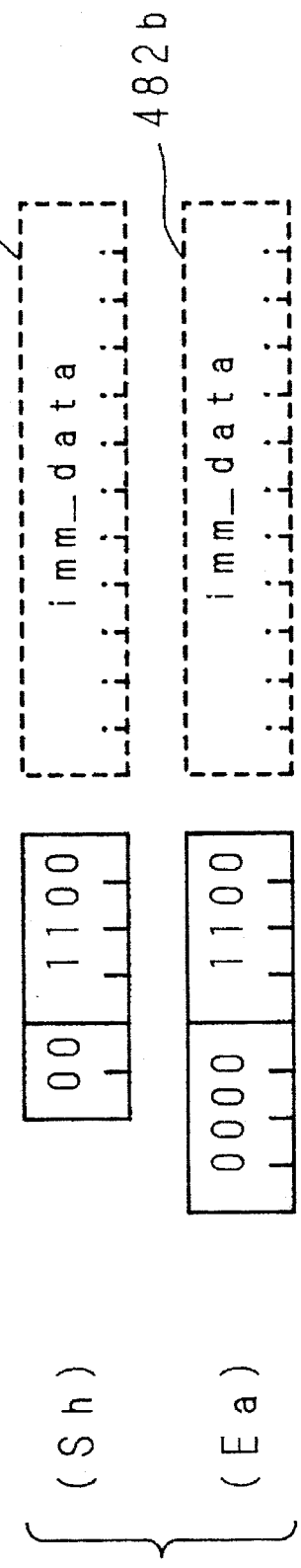

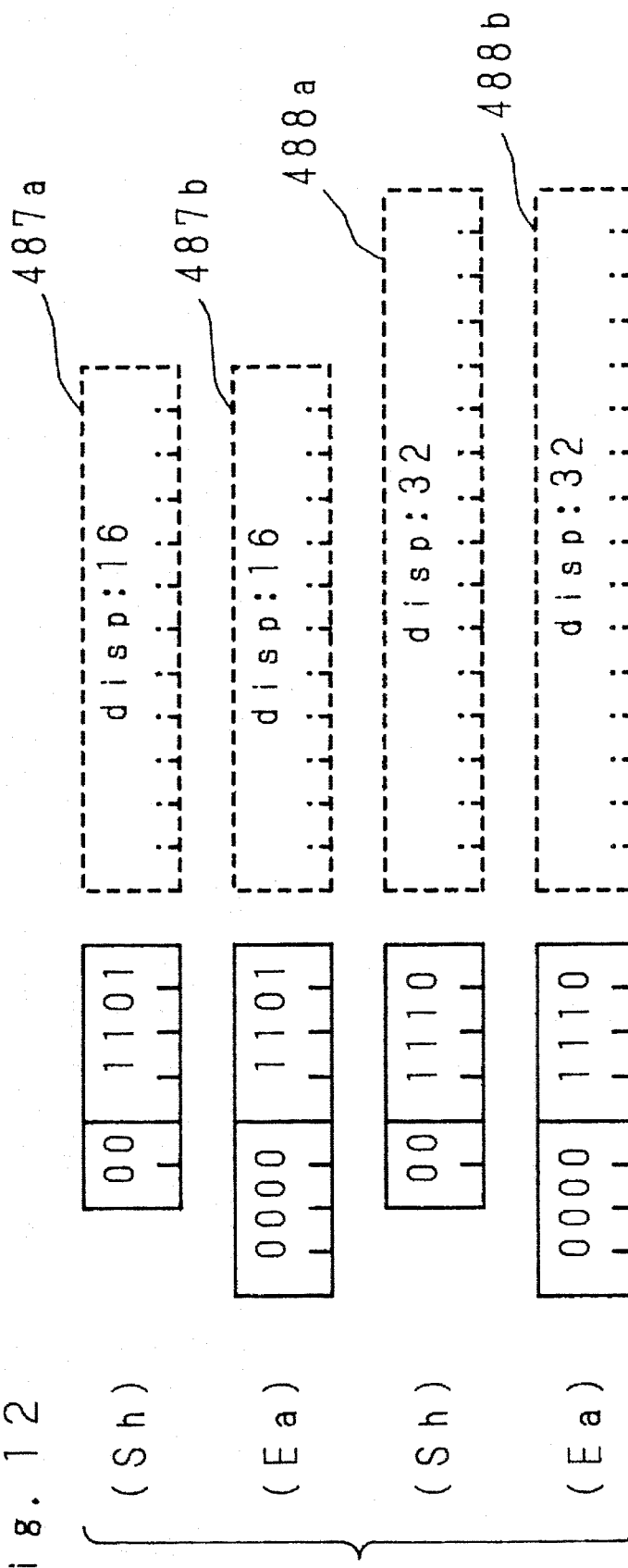
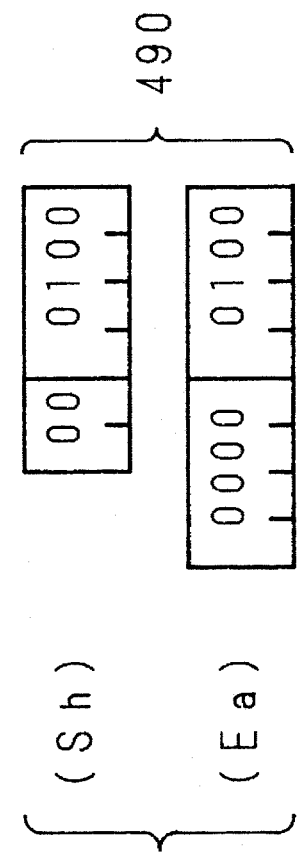

(Ea) `0110 | Rn` —496
       494
CHAINED ADDRESSING MODE
CHAINED ADDRESSING MODE

CHAINED ADDRESSING MODE
CHAINED ADDRESSING MODE
CHAINED ADDRESSING MODE
CHAINED ADDRESSING MODE

Fig. 17

```
       ┌──┬────┐   ┌──────────────┐   ┌──────────────┐
 (Sh)  │00│1011│---│   CHAINED    │---│   CHAINED    │
       └──┴────┘   │ADDRESSING MODE│   │ADDRESSING MODE│
500 ⎰                └──────────────┘   └──────────────┘
    ⎱  ┌────┬────┐   ┌──────────────┐   ┌──────────────┐
 (Ea)  │0000│1011│---│   CHAINED    │---│   CHAINED    │
       └────┴────┘   │ADDRESSING MODE│   │ADDRESSING MODE│
                     └──────────────┘   └──────────────┘
```

Fig. 18

```
BYTE:    0              1           2        N+2
       ┌──┬──┬──┬────┬──┐ ┌────┐    ┌──────┐
       │EI│Rx│M0│OXXD│d4│ │    │    │ dispx│
       └──┴──┴──┴────┴──┘ └────┘    └──────┘
        └─502
```

Fig. 22

[ INSTRUCTION FORMAT AND NOTATION ]

STM    reglist.W[#16/1],dests.W[Gen-IRC/wx]

| 1000101 | 0 | dests | reglist |

[ CONTENT OF reglist WHEN dests IS @-SP MODE ]

MSB → LSB

| [bit POSITION] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| [REGISTER] | R15 | R14 | R13 | R12 | R11 | R10 | R9 | R8 | R7 | R6 | R5 | R4 | R3 | R2 | R1 | R0 |

[ CONTENT OF reglist WHEN dests IS OTHER THAN @-SP MODE ]

MSB → LSB

| [bit POSITION] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| [REGISTER] | R0 | R1 | R2 | R3 | R4 | R5 | R6 | R7 | R8 | R9 | R10 | R11 | R12 | R13 | R14 | R15 |

Fig. 23

[ INSTRUCTION FORMAT AND NOTATION ]

ENTER:E lsize[#8/s],reglist.s[#16/l]

| 1 0 0 0 1 1 1 S | lsize | reglist |
|---|---|---|

ENTER:G lsize,sy[Gen-M/r],reglist.s[#16/l]

| 0 0 0 0 0 0 S | 1 1 1 1 P 1 1 1 | 1 — 0 1 1 | sy | lsize |
|---|---|---|---|---|

| reglist |
|---|

[ OPERATION ]

FP==>@-SP
SP==>FP
SP-lsize==>SP
registers(reglist)==>@-SP

MSB ⟶                                                              ⟵ LSB

| [bit POSITION] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| [REGISTER] | = | = | R13 | R12 | R11 | R10 | R9 | R8 | R7 | R6 | R5 | R4 | R3 | R2 | R1 | R0 |

Fig. 24

[ INSTRUCTION FORMAT AND NOTATION ]

EXITD:E reglist.s[#16/1],adjsp[#8/s]

| 1 0 0 0 1 1 1 | S | adjsp | reglist |

EXITD:G reglist.s[#16/1],adjsp.sy[Gen-M/r]

| 0 0 0 0 0 + | S | 1 1 1 1 P 1 1 1 | 1--111 | sy | adjsp |

| reglist |

[ OPERATION ]
adjsp===>tmp
@SP+===>registers(reglist)
FP===>SP
@SP+===>FP
@SP+===>PC
SP+tmp===>SP

MSB →

| [ bit POSITION ] | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| [ REGISTER ] | R0 | R1 | R2 | R3 | R4 | R5 | R6 | R7 | R8 | R9 | R10 | R11 | R12 | R13 | = | = |

→ LSB

Fig. 33

| INSTRUCTION | LDM @SP+, (R1,R4,R5,R6,R7,R8) |
|---|---|
| REGISTER LIST | 0100 111 1000 0000 |
| SP INITIAL VALUE | H'00001000 |

S5
ACCORDING TO PARALLEL ACCESS SIGNAL 8 WHICH HAS BEEN NEGATED, VALUE OF ASP 231 IS INCREMENTED BY "4" AND VALUE "H' 00001004" IS TRANSFERRED TO ADDRESS ADEER 217 THROUGH IX BUS. BY INPUTTING ZERO TO OTHER TWO INPUTS OF ADDRESS ADDER 217, ADDRESS "H' 00001004" OF DATA TO BE FETCHED IS OBTAINED. SIMULTANEOUSLY, VALUE OF TRANSFER OPERAND NUMBER COUNTER 26 IS DECREMENTED BY "1" TO BECOME "5".

S6
FIRST ENCODING CIRCUIT 3 SEARCHES FIRST "1" FROM OFFSET "2" OF BIT STRING "01001111 10000000" OF REGISTER LIST, AND OUTPUTS RESULT "4" TO ENCODED RESULT JUDGING CIRCUIT 7. SIMULTANEOUSLY, SECOND ENCODING CIRCUIT 4 SEARCHES FIRST "1" FROM OFFSET "2" OF BIT STRING "00001111 00000000", AND OUTPUTS RESULT "4" TO ENCODED RESULT JUDGING CIRCUIT 7. IN ENCODED RESULT JUDGING CIRCUIT 7, JUDGING THAT VALUE "4" INPUTTED FROM FIRST ENCODING CIRCUIT 3 AND VALUE "4" INPUTTED FROM SECOND ENCODING CIRCUIT 4 DO COINCIDE, AND THAT LOWER 3 BITS OF ADDRESS OUTPUTTED FROM OPERAND ADDRESS CALCULATION UNIT 115 ARE NOT ZERO, REGISTER NUMBER "4" IS OUTPUTTED, NEGATING PARALLEL ACCESS SIGNAL 8 AND OUTPUTTING ENCODED RESULT "4" AND ADDED VALUE "1" TO OFFSET VALUE DESIGNATING CIRCUIT 2.

S7
SECOND INTERNAL CODE LDM2 IS OUTPUTTED TO F STAGE 34 IN ORDER TO FETCH 4-BYTE DATA INTO REGISTER R4, BY INFORMATION OF REGISTER NUMBER "4" OUTPUTTED FROM ENCODED RESULT JUDGING CIRCUIT 7, PARALLEL ACCESS SIGNAL 8 NEGATED, COUNT VALUE "5" OF TRANSFER OPERAND NUMBER COUNTER 26, FETCHING DESTINATION ADDRESS "H' 00001004".

S8
ACCORDING TO PARALLEL ACCESS SIGNAL 8 WHICH HAS BEEN NEGATED, VALUE OF ASP 231 IS INCREMENTED BY "4" AND VALUE "H' 00001008" IS TRANSFERRED TO ADDRESS ADEER 217 THROUGH IX BUS. BY INPUTTING ZERO TO OTHER TWO INPUTS OF ADDRESS ADDER 217, ADDRESS "H' 00001008" OF DATA TO BE FETCHED IS OBTAINED. SIMULTANEOUSLY, VALUE OF TRANSFER OPERAND NUMBER COUNTER 26 IS DECREMENTED BY "1" TO BECOME "4".

S9
FIRST ENCODING CIRCUIT 3 SEARCHES FIRST "1" FROM OFFSET "5" OF BIT STRING "01001111 10000000" OF REGISTER LIST, AND OUTPUTS RESULT "5" TO ENCODED RESULT JUDGING CIRCUIT 7. SIMULTANEOUSLY, SECOND ENCODING CIRCUIT 4 SEARCHES FIRST "1" FROM OFFSET "5" OF BIT STRING "00001111 00000000", AND OUTPUTS RESULT "5" TO ENCODED RESULT JUDGING CIRCUIT 7. IN ENCODED RESULT JUDGING CIRCUIT 7, JUDGING THAT VALUE "5" INPUTTED FROM FIRST ENCODING CIRCUIT 3 AND VALUE "5" INPUTTED FROM SECOND ENCODING CIRCUIT 4 DO COINCIDE, AND THAT LOWER 3 BITS OF ADDRESS OUTPUTTED FROM OPERAND ADDRESS CALCULATION UNIT 115 ARE ZERO, REGISTER NUMBER "5" IS OUTPUTTED, ASSERTING PARALLEL ACCESS SIGNAL 8 AND OUTPUTTING ENCODED RESULT "5" AND ADDED VALUE "2" TO OFFSET VALUE DESIGNATING CIRCUIT 2.

S10
THIRD INTERNAL CODE LDM3 IS OUTPUTTED TO F STAGE 34 IN ORDER TO FETCH 4-BYTE DATA INTO REGISTER R5 AND R6, BY INFORMATION OF REGISTER NUMBER "5" OUTPUTTED FROM ENCODED RESULT JUDGING CIRCUIT 7, PARALLEL ACCESS SIGNAL 8 ASSERTED, COUNT VALUE "4" OF TRANSFER OPERAND NUMBER COUNTER 26, FETCHING DESTINATION ADDRESS "H' 00001008".

Fig. 37

| INSTRUCTION | STM (R1,R4,R5,R6,R7,R8), @-SP |
| --- | --- |
| REGISTER LIST | 0000 0001 1111 0010 |
| SP INITIAL VALUE | H'00002000 |

DATA PROCESSOR INCLUDING A DECODING UNIT FOR DECOMPOSING A MULTIFUNCTIONAL DATA TRANSFER INSTRUCTION INTO A PLURALITY OF CONTROL CODES

This is a continuation of application Ser. No. 07/820,455, filed Jan. 13, 1992, now abandoned.

BACKGROUND OF THE INVENTION

1. Field of the Invention

The present invention relates to a data processor which decomposes one instruction by a decoder into a plurality of internal codes for pipelining. More particularly, it relates to a data processor which decomposes the instruction for transferring plural data between a register file and a memory by a decoder into a plurality of transferring instructions for pipelining.

2. Description of the Prior Art

In a conventional data processor, such a configuration is adopted, that about 16 general purpose registers are provided for the purpose of accessing data which are used at a high frequency with a simple mechanism at high speed, and that data to be accessed at a high frequency or the intermediate operation result are held in the registers.

In software processing, a method of replacing data kept in the registers at each round of serial operations is used. Therefore, such processings as storing plural data from the registers to a memory in series, or conversely, loading plural data from the memory onto the registers in series are performed frequently. In high-level languages such as C or Pascal, a method of keeping variables which are used frequently in the registers at every procedure is often used, and in softwares written in these languages, it is quite often that plural data are stored in the memory from the register or loaded onto the register from the memory.

From such circumstances, a data processor including the plural data transfer instruction which stores plural data to the memory from the register by one instruction, or loads the plural data onto the register from the memory by one instruction is proposed.

In the conventional data processor, when processing the plural data transfer instruction as aforementioned, the instruction was processed by successively executing plural processings necessary for executing the instruction by microprograms. A data processor which decomposes one instruction into plural processings for execution by using the microprograms is known for a long time, for example, it particularly described in "Computer Architecture A Quantitative Approach" chapter No. 5.5, by J. L. Hennessy and D. A. Patterson, Morgan Kaufmann Publishers, Inc. 1990. Also, a data processor which decomposes the plural data transfer instruction into plural processings for execution by the microprograms disclosed in another patent application filed by the inventor, for example, in Japanese Patent Application No. 2-231966(1990).

In the conventional data processor in which the plural data transfer instruction is decomposed into plural processings in the instruction executing stage for execution by the microprograms or the like, even in the case of including a mechanism for pipelining, the plural data transfer instruction is totally processed only in the execution stage, and in the operand address calculating stage and operand fetching stage, processings are not performed at all or hardly any processing is performed.

In the case where the plural data transfer instruction is processed in the executing stage, it is processed by dividing roughly into three stages, preprocessing, actual processing and after-processing. The preprocessing and after-processing among them are not the processings which are designated by the plural data transfer instruction, but are overheads depending upon hardwares.

Specifically, in case of expanding and processing the plural data loading instruction for loading plural data onto the register from the memory by the microprograms, in accordance with a register list, indicated by a bit string of "1" and "0", as preprocessing of data transfer processing from the memory to the register which is the essential processing of the instruction, the register list outputted from an instruction decoder must be transferred to a priority encoder.

In the conventional data processor, for example, as stated above, in case of executing the plural data transfer instruction, since preprocessing for analyzing data serving as parameters of the microprograms such as the register list in the instruction executing stage is necessary, an extra time for such processing is required besides the essential processing, and results in a factor which prevents high-speed execution of the plural data transfer instruction.

SUMMARY OF THE INVENTION

The present invention has been devised in view of such circumstances, therefore, it is an object thereof to provide a data processor capable of processing the instruction which loads plural data onto the register from the memory or stores into the memory from the register by one instruction at high efficiency.

A first invention of the data processor of the present invention, comprises: an instruction decoding unit which decomposes the instruction for loading plural data onto the register from the memory into plural internal codes; an instruction executing unit which is connected to an external memory through a data bus and executes the instruction; and an instruction execution control unit which controls execution of the instruction by the instruction executing unit, in accordance with respective internal codes outputted from the instruction decoding unit.

A second invention of the data processor of the present invention, comprises: an instruction decoding unit which decomposes the instruction for storing plural data into the memory from the register into plural internal codes; an instruction executing unit which is connected to an external memory through a data bus and executes the instruction; and an instruction execution control unit which controls execution of the instruction by the instruction executing unit, in accordance with respective internal codes outputted from the instruction decoding unit.

In the first invention of the data processor of the present invention, when decoding the instruction for loading data onto plural registers including a first register and a second register from a predetermined memory area of the memory in the instruction decoding unit, the instruction decoding unit generates a first control code which designates to load first data onto a first register from the memory area in a first processing period to output to the instruction execution control unit, and generates a second control code which designates to load second data onto a second register from the memory area in a second processing period to output to the instruction execution control unit, and the instruction executing unit loads the first, data onto the first register from the memory area via a data bus, in accordance with the control of the instruction execution control unit in the second processing period, and in a third processing period, loads the second data onto the second register from the memory area via the data bus, in accordance with the control of the instruction execution control unit.

Also, in the second invention of the data processor of the present invention, when decoding the plural data storing instruction for storing data into a predetermined area of the memory, from plural registers including the first register and the second register in the instruction decoding unit, the instruction decoding unit generates the first control code which designates to store the first data into the memory area from the first register in the first processing period to output to the instruction execution control unit, and generates the second control code which designates to store the second data into the memory area from the second register in the second processing period to output to the instruction execution control unit, and the instruction executing unit stores the first data into the memory area from tube first register via the data bus, in accordance with the control of the instruction execution control unit in the second processing period, and in the third processing period, stores the second data into the memory area from the second register via the data bus, in accordance with the control of the instruction execution control unit.

The above and further objects and features of the invention will more fully be apparent from the following detailed description with accompanying drawings.

BRIEF DESCRIPTION OF THE DRAWINGS

FIG. 3 is a schematic diagram showing a short format of a 2-operand instruction of a data processor of the present invention, FIG. 4 is a schematic diagram showing a G1-format of 1-operand instruction of a data processor of the present invention, FIG. 5 is a schematic diagram showing a G1-format of a 2-operand instruction of a data processor of the present invention, FIG. 9 is a schematic diagram of a format of a register relative indirect mode of a data processor of the present invention, FIG. 10 is a schematic diagram of a format of an immediate mode of a data processor of the present invention, FIG. 12 is a schematic diagram of a format of a PC relative indirect mode of of a data processor of the present invention, FIG. 13 is a schematic diagram of a format of a stack pop mode of a data processor of the present invention, FIG. 14 is a schematic diagram of a format of a stack push mode of a data processor of the present invention, FIG. 15 is a schematic diagram of a format of a register base chained mode of a data processor of the present invention, FIG. 16 is a schematic diagram of a format of a PC base chained mode of a data processor of the present invention, FIG. 17 is a schematic diagram of a format of an absolute base chained mode of a data processor of the present invention, FIG. 18 is a schematic diagram of a format of multi-stage indirect mode of a data processor of the present invention, FIG. 22 is a schematic diagram showing a format of the STM instruction which is a plural data storing instruction of a data processor of the present invention, FIG. 23 is a schematic diagram showing an ENTER instruction format of a data processor of the present invention, FIG. 24 is a schematic diagram showing an EXITD instruction format of a data processor of the present invention, FIG. 28 is a block diagram showing a detailed configuration of a bit number count circuit of a data processor of the present invention, FIG. 33 is a schematic diagram showing an example of specific operation code of the LDM instruction which is a plural data loading instruction of a data processor of the present invention, FIGS. 34(a) through (e) are flow charts showing a processing algorithm which outputs an internal code, when a specific example of LDM instruction of a data processor of the present invention is decoded by an instruction decoding unit, FIGS. 35(a) and (b) are flow charts showing a processing algorithm in an instruction executing unit, when a specific example of LDM instruction of a data processor of the present invention is executed, FIG. 37 is a schematic diagram showing an example of specific operation code of the STM instruction which is a plural data storing instruction of a data processor of the present invention.

DESCRIPTION OF THE PREFERRED EMBODIMENTS

In the following, the present invention will be particularly described with reference to the drawings showing its embodiments.

(1) "Configuration of a System using a Data Processor of the Present Invention"

Figure 1:
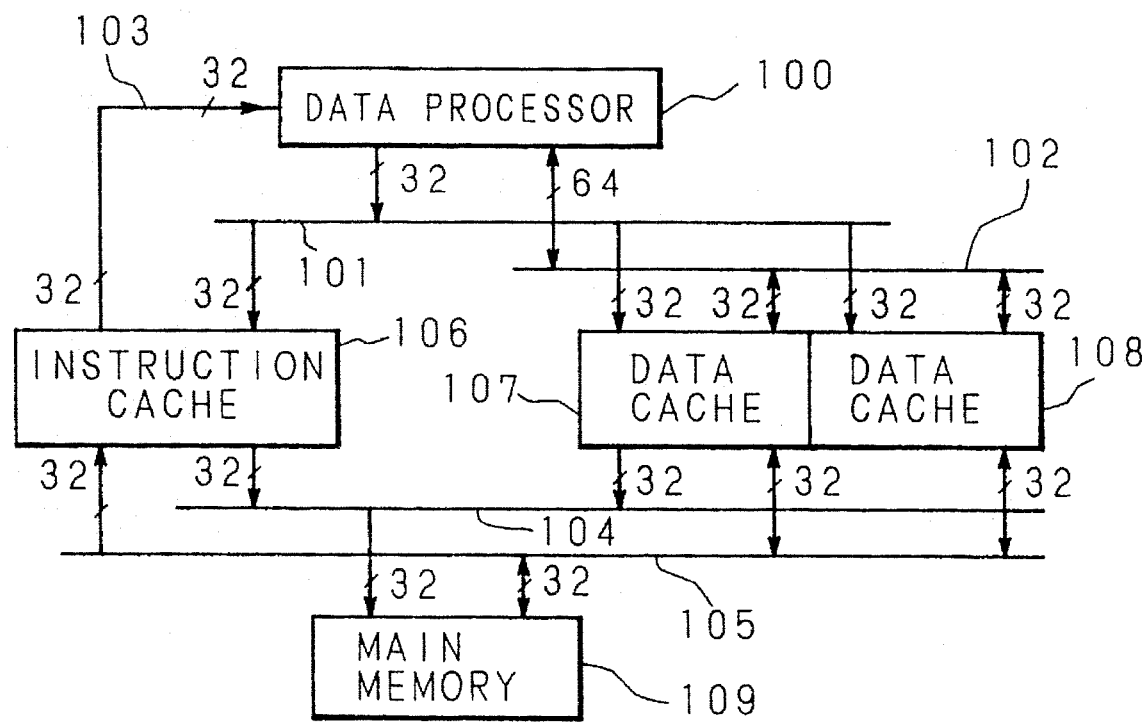
FIG. 1 is a block diagram showing an example of configuration of a data processing system using a data processor of the present invention.

FIG. 1 is a block diagram showing an example of a configuration of a system using a data processor of the present invention.

In this configuration, a data processor 100 of the present invention, an instruction cache 106, data caches 107 and 108, and a main memory 109 are connected by an address bus 101, a data bus 102, an instruction bus 103, a memory address bus 104, and a memory data bus 105.

The address bus 101 transfers the address outputted from the data processor 100 of the present invention into the instruction cache 106 and the data caches 107, 108. The instruction bus 103 transfers the instruction code outputted from the instruction cache 106 to the data processor 100 of the present invention. The data bus 102 transfers data outputted from the data processor 100 of the present invention to the data caches 107, 108, or data outputted from the data caches 107, 108 to the data processor 100 of the present invention. The memory address bus 104 transfers the address outputted from the instruction cache 106 or the data caches 107, 108 to the main memory 109. The memory data bus 105 transfers the instruction or data between the main memory 109 and the instruction cache 106 or the data caches 107, 108.

When the instruction cache 106 or the data caches 107, 108 misses, the caches 106 and 107 arbitrate the memory address bus 104 and the memory data bus 105 to access the main memory 109.

In the data caches 107, 108, on the side of the data processor 100 of the present invention, two chips are operated in cooperation with each other to associate with a 64-bit bus. For each of the 64-bit data, the data cache 107 treats the high-order 32-bit data and the data cache 108 treats the low-order 32-bit data.

In the following, first, instructions and a processing mechanism of the data processor 100 of the present invention will be explained, and next, pipeline operations of the data processor 100 will be explained when it executes LDM, BTM, ENTER, and EXITD instructions which are instructions for transferring data in a plurality of registers.

(2) "Instruction Format of the Data Processor of the Present Invention"

An instruction of a data processor of the present invention is formed on a 16-bit unit basis, being variable in length. No instruction with an odd number of bytes is used herein.

The data processor of the present invention has an instruction format specifically devised for the purpose of highly frequent instructions in a short format. For example, as to a two-operand instruction, two formats are provided; a general format which has basically a configuration of "four bytes+ extension part(s)" and allows the utilization of all addressing modes and a short format allowing only the use of a highly frequent instruction and an addressing mode.

The meanings of symbols appearing in the instruction format of the data processor of the present invention shown in FIG. 2 to FIG. 6 are as follows:

-: Field for operation code.

Ea: Field for generating an operand in a general type 8-bit addressing mode.

Sh: Field for specifying an operand in a short type 6-bit addressing mode.

Rn: Field for specifying an operand in a register by the register number.

Figure 2:
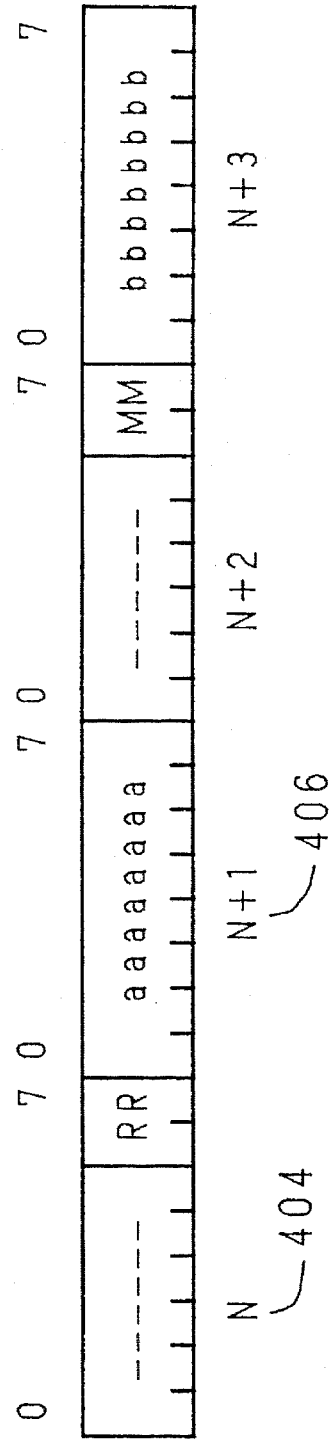
FIG. 2 is a schematic diagram of an instruction format, of a data processor of the present invention.

In the format, as shown in FIG. 2, the right side 402 is the LSB side and is higher address. The instruction format can be discriminated only after an address N 404 and an address N+1 406 are checked. As described above, this is because of a premise that the instruction is fetched and decoded on a 16-bit (half word) unit basis without fail.

In the data processor of the present invention, in the case with any format, the extension part of Ea or Sh of each operand is sure to be positioned immediately after 16 bits (half word) comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next operation field.

For example, consideration is made on the case of 6-byte instruction which comprises Ea1 in a first half word, Ea2 in a second half word, and ends with a third half word. In the case where the chained addressing mode is used for Ea1, and Ea2 has extension part, the actual instruction bit pattern is composed in the sequence of the first half word of instruction (including the basic part of Ea1), the chained addressing mode of Ea1, the second half word of instruction (including the basic part of Ea2), the extension part of Ea2 and the third half word of instruction.

(2.1) "Short-Format Two-Operand Instruction"

FIG. 3 is a schematic diagram showing short format of the two-operand instruction.

This format includes a L-format wherein the source operand side is memory and a S-format wherein the destination operand side is memory.

In the L-format, symbol Sh 410 represents the specifying field of the source operand, symbol Rn 412 represents the specifying field of the register of the destination operand and RR 414 represents specifying of the operand size of Sh 410, respectively. The size of the destination operand located in the register is fixed to 32 bits. Where the size of the resister side differs from that of the memory side and the size of the source side is smaller, sign extension is performed.

In the S-format, symbol Sh 410 represents the specifying field of the destination operand, symbol Rn 412 represents the register specifying field of the source operand and RR 414 represents specifying of the operand size of Sh 410, respectively. The size of the source operand located in the register is fixed to 32 bits. Where the size of the register side differs from that of the memory side and the size of the source side is larger, truncating of the overflow portion and overflow check are performed.

(2.2) "General-Format One-Operand Instruction"

FIG. 4 is a schematic diagram showing a general format 436 of one-operand instruction (G1-format).

Symbol MM 438 represents the specifying field of the operand size. Some of the G1-format instructions comprise an extension part besides the extension part of Ea 440. There are also instructions using no MM 438.

(2.3) "General-Format Two-Operand Instruction"

FIG. 5 is a schematic diagram showing general format of two-operand instruction.

This format comprises an instruction having a maximum of two operands of the general-type addressing mode which are specified by eight bits. There are cases where the total number of operands becomes three or more.

Symbol EaM 444 represents the specifying field of the destination operand, symbol MM 446 represents the specifying field of the destination operand size, EaR 448 represents the specifying field of the source operand, and RR 449 represents the specifying field of the source operand size.

Some of the G-format instructions comprise an extension part besides the extension part of EaM 444 and EaR 448.

Figure 6:
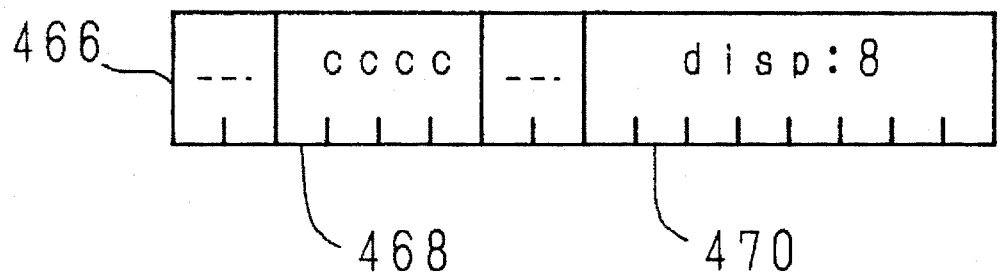
FIG. 6 is a schematic diagram showing a short branch instruction format of a data processor of the present invention.

FIG. 6 is a schematic diagram showing a format 466 of a short branch instruction.

Symbol cccc 468 represents the specifying field of a branch condition, symbol disp:8 470 represents the specifying field of displacement to a jump destination, and in the data processor of the present invention, when displacement is specified by eight bits, the displacement value is set by doubling the specified value in the bit pattern.

(2.4) "Addressing Mode"

The methods of specifying the addressing mode of the data processor of the present invention include the short type specified by six bits including the register and the general type specified by eight bits.

Where an undefined addressing mode has been specified, or where a combination of addressing modes obviously unsuitable has been specified, a reserved instruction exception is generated, likewise, the case where the undefined instruction has been executed, and exception processing is started.

Examples of these cases are the case where the destination is the immediate mode and the case where the immediate mode is used in the specifying field of the addressing mode to be accompanied by address calculation.

Meanings of symbols used in the format diagram shown in FIG. 7 to FIG. 17 is as follows:

Rn: Register specifying field (Sh): Designating method by the short-type addressing mode of six bits (Ea): Designating method by the general-type addressing mode of eight bits In the format diagram, the portion surrounded by a broken line shows the extension part.

(2.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate mode, an absolute mode, a Program Counter (PC) relative indirect mode, a stack pop mode and a stack push mode.

Figure 7:
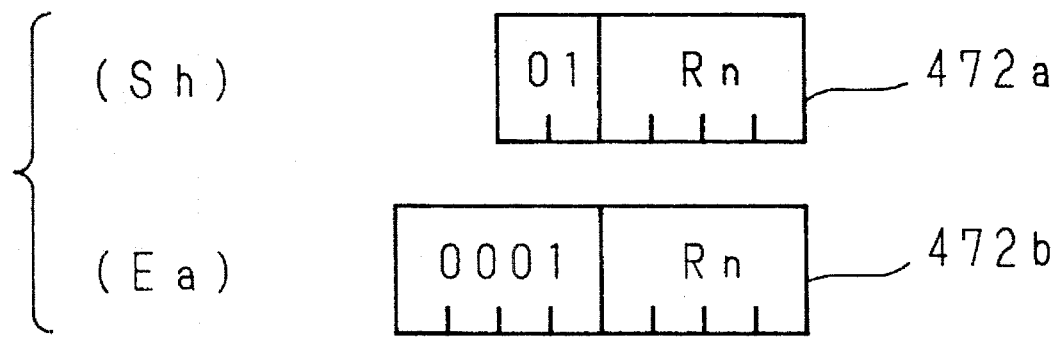
FIG. 7 is a schematic diagram showing a format of a register direct mode of a data processor of the present invention.

The register direct mode takes the content of a register intact as an operand. FIG. 7 is a schematic diagram of the format thereof. Each symbol Rn 472a, 472b shows the number of the general-purpose register.

Figure 8:
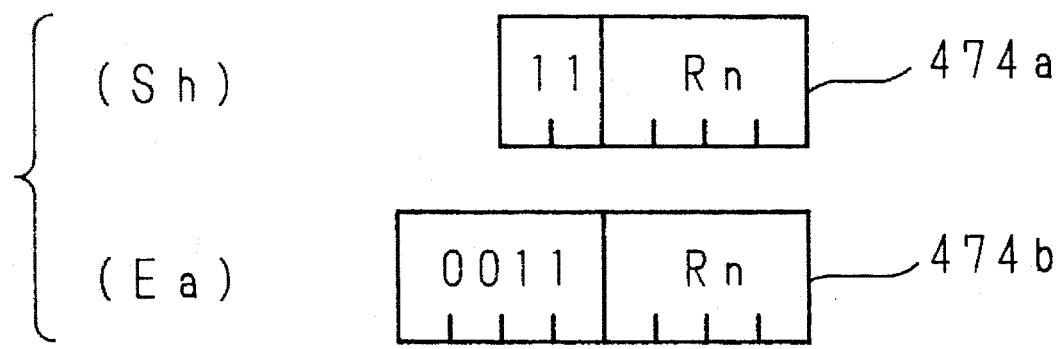
FIG. 8 is a schematic diagram of a format of a register indirect mode of a data processor of the present invention.

The register indirect mode takes as an operand the content of the memory whose address is the content of a register. FIG. 8 is a schematic diagram of the format thereof. Each symbol Rn 474a, 474b shows the number of the general-purpose register.

The register relative indirect mode includes two kinds (16 bits and 32 bits) of the displacement value. Each of them takes as an operand the content of the memory whose address is the value of the content of the register added to the displacement value of 16 bits or 32 bits. FIG. 9 is a schematic diagram of the format thereof. Each symbol Rn 476a, 476b, 476c shows the number of the general-purpose register. Each symbol disp:16 478a, 478b and disp:32 480 shows the displacement value of 16 bits and the displacement value of 32 bits, respectively. The displacement value is handled with a signed binary number.

The immediate mode takes as an operand the bit pattern specified in the instruction code while assuming it intact as a binary number. FIG. 10 is a schematic diagram of the format thereof. Each symbol imm_data 482a, 482b shows the immediate. The size of imm_data is specified in the instruction as the operand size.

Figure 11:
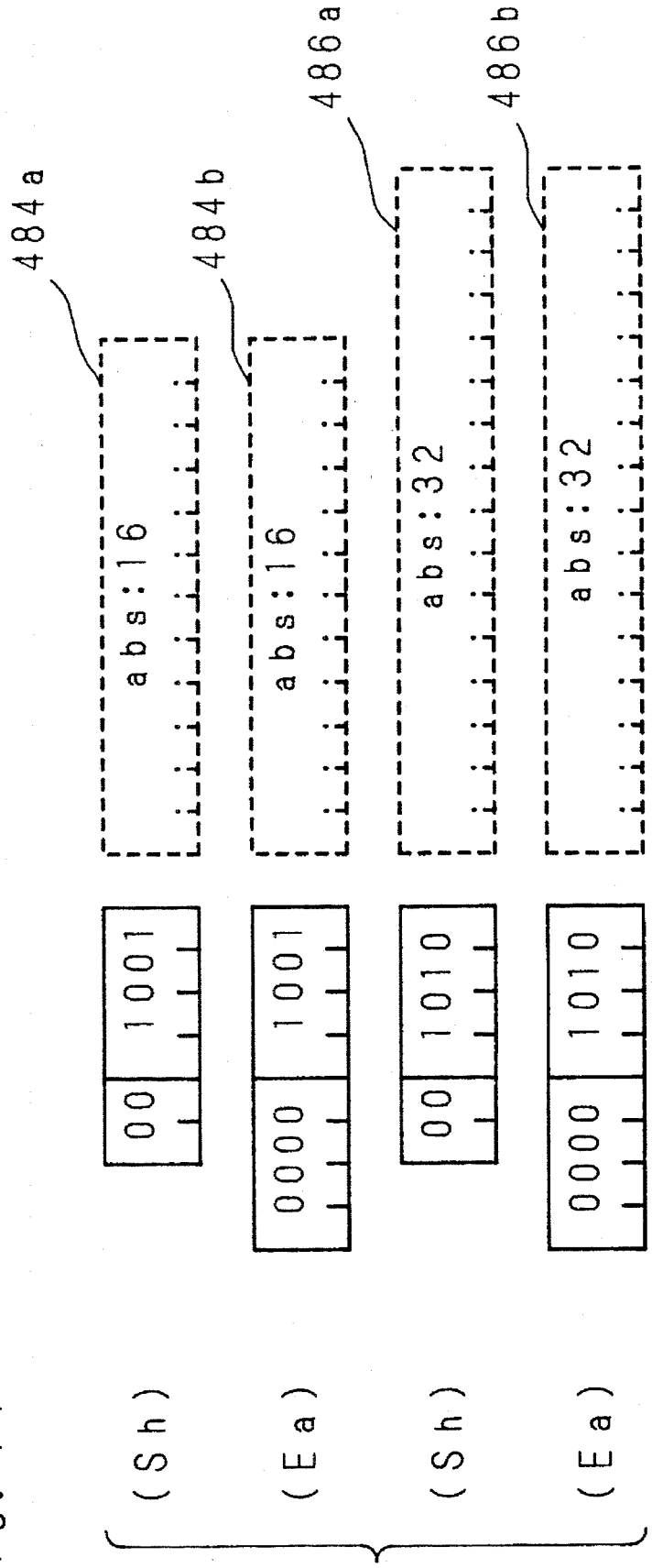
FIG. 11 is a schematic diagram of a format of an absolute mode of a data processor of the present invention.

The absolute mode includes two kinds of field (16 bits and 32 bits) for showing the address value. Each kind takes as an operand the content of the memory whose address is the bit pattern of 16 bits or 32 bits specified in the instruction code. FIG. 11 is a schematic diagram showing the format thereof. Each symbol abs:16 484a, 484b and abs:32 486a shows the address value of 16 bits and 32 bits, respectively. When the address is shown by abs:16, the specified address value is sign-extended to 32 bits.

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 12 is a schematic diagram showing the format thereof. Each symbol disp:16 486a, 486b and disp:32 488a, 488b shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operands of sizes of 8 bits, 16 bits and 64 bits can also be performed, and the SP is renewed (incremented) by +1, +2 and +8, respectively. FIG. 18 is a schematic diagram of the format thereof. As to the one wherein the stack pop mode is invalid for the operand, a reserved instruction exception is generated. Specifically, the stack pop mode specifying for a write operand and a read-modify-write operand becomes the reserved instruction exception.

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to specify the stack push mode for operands of sizes of 8 bits, 16 bits and 64 bits, and the SP is renewed (decremented) by −1, −2 and −8, respectively. FIG. 14 is a schematic diagram showing the format thereof. As to the one wherein the stack push mode is invalid for the operand, a reserved instruction exception is generated. Specifically, the stack push mode specifying a read operand and a read-modify-write operand becomes the reserved instruction exceptions.

(2.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When specifying the chained addressing mode, in the basic addressing mode specifying field, one is specified from among three kinds of specifying methods viz. a register base chained addressing mode, a PC base chained addressing mode and an absolute chained addressing mode.

The register base chained addressing mode is an addressing mode taking the value of register as the base value of the chained addressing to be extended. FIG. 15 is a schematic diagram showing the format 494 thereof. Symbol Rn 496 shows the number of the general-purpose register.

The PC base chained addressing mode is an addressing mode taking the value of the program counter (PC) as the base value of the chained addressing to be extended. FIG. 16 is a schematic diagram showing the format 498 thereof.

The absolute base chained addressing mode is an addressing mode taking zero as the base value of the chained addressing to be extended. FIG. 17 is a schematic diagram of the format 500 thereof.

The chained addressing mode specifying field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 18 is a schematic diagram showing the format 502 of the chained addressing mode. Each field has meanings as shown below.

E=0: Chained addressing mode is continued.

E=1: Address calculation ends. tmp→address of operand

I=0: No memory indirect reference is performed. tmp+ disp+Rx*Scale→tmp

I=1: Memory indirect reference is performed. mem[tmp+ disp+Rx*Scale]→tmp

M=0: <Rx> is used as an index.

M=1: Special index

<Rx>=0 Index value is not added (Rx=0).

<Rx>=1 Program counter is used as an index value (Rx=PC).

<Rx>=2 or more Reserved.

D=0 : The value of field d4 of four bits in the chained addressing mode is quadrupled to be taken as a displacement value, and this value is added. The d4 is handled with a signed binary number, and is used by surely quadrupling it irrespective of the size of the operand.

D=1: The dispx (16/32 bits) specified in the extension part of the chained addressing mode is taken as a displacement value, the size of the extension part whereto this value is added is specified in the d4 field.

| | |
|---|---|
| d4 = 0001 | dispx: 16 bits |
| d4 = 0010 | dispx: 32 bits |

XX: Index scale (scale=1/2/4/8)

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 19:
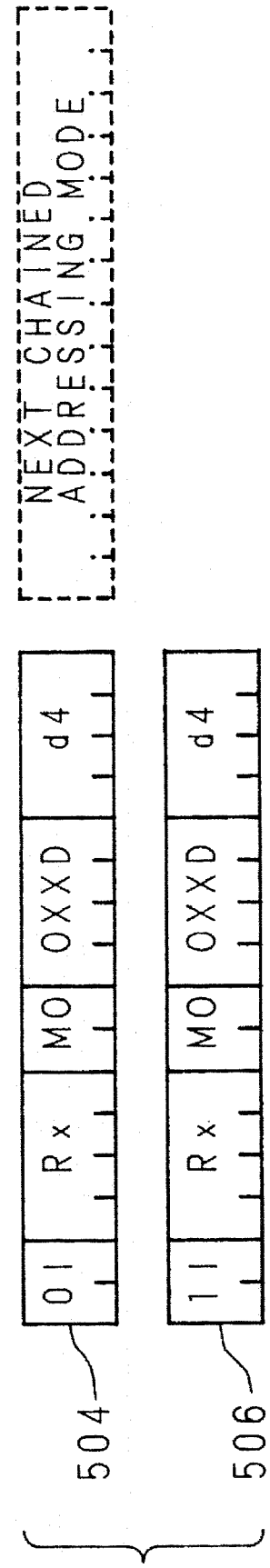
FIG. 19 is a schematic diagram showing variations of whether a chained mode of an instruction format according to a chained addressing mode of a data processor of the present invention is continued or finished.
Figure 20:
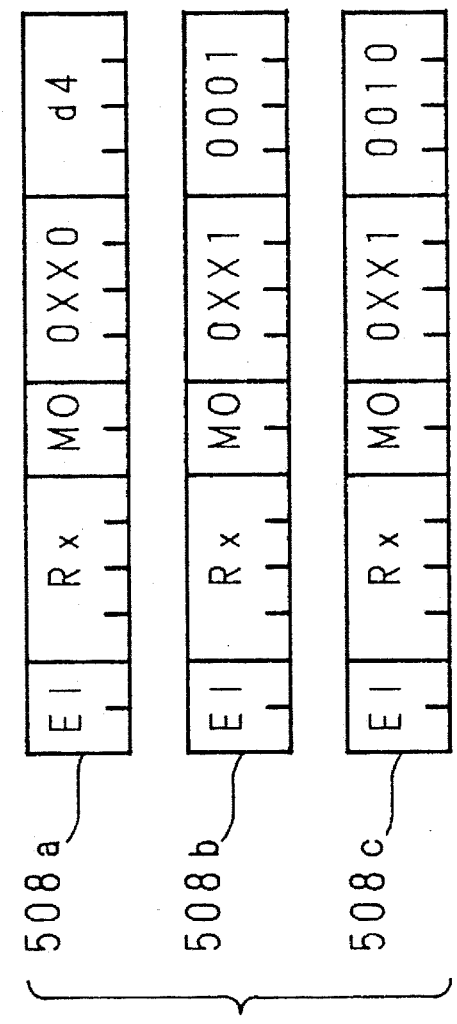
FIG. 20 is a schematic diagram showing variations in the displacement size of an instruction format according to a chained addressing mode of a data processor of the present invention.

FIGS. 19 and 20 show variations on the instruction format formed by the chained addressing mode.

FIG. 19 shows variations of continuation 504 and completion of the chained addressing mode.

FIG. 20 shows variations 508a, 508b, 508c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(2.5) "Saving and Restoring Register Instructions"

A data processor 100 of the present invention comprises STM instruction which stores the contents of a plurality of registers into a memory area such as a stack area, and LDM instruction which loads the contents of a plurality of registers saved into the memory area such as the stack area.

Figure 21:
FIG. 21 is schematic diagram showing a format of the LDM instruction which is a plural data loading instruction of a data processor of the present invention.

A format of the LDM instruction is schematically shown in FIG. 21. In the LDM instruction, data are transferred to registers specified in a reglist filed from an address of the memory calculated in accordance with an addressing mode specified in the srcs field. The registers into which the data are transferred are specified by a bit pattern in the reglist field. Data transferred to each register are respectively four bytes.

A format of the STM instruction is shown schematically in FIG. 22. In the STM instruction, data in registers specified in the reglist filed are transferred to an address of the memory calculated in accordance with an addressing mode specified in the dests field. The registers from which the data are transferred are specified by a bit pattern in the reglist field. As shown in FIG. 22, meaning of the reglist field of the STM instruction differs with the addressing modes specified in the dests field. This is because that, when a plurality of register contents are stored in the memory, it is unified to store the register with larger number always in the higher address. The data transferred from each of the registers are respectively four bytes.

(2.5.2) "Forming-Stack-Frame and Releasing-Stack-Frame Instructions"

The data processor 100 of the present invention includes, in addition to the aforementioned STM instruction and LDM instruction, an ENTER instruction which executes the stack-frame forming and register saving at entrance of a subroutine in high-level languages, and an EXITD instruction which executes the stack-frame release and register restore at exit of the subroutine in the high-level languages are provided.

The format of the ENTER instruction is shown in a schematic diagram of FIG. 23. Processing of the ENTER instruction is as shown in operations of FIG. 23.

At first, a frame pointer FP is pushed to the stack and a stack pointer SP is transferred to the FP. Meanwhile, a lsize value is subtracted from an SP value and a local variable area is secured in the stack, then registers indicated in the register list are saved into the stack. In the register list of the ENTER instruction, as shown in FIG. 23, the registers R14 and R15 can not be designated.

In the ENTER instruction format, there are an E format which designates the lsize value by an 8-bit immediate value and a G format which designates by a general addressing mode.

The format of EXITD instruction is shown in FIG. 24. Processing of the EXITD instruction is as shown in operations of FIG. 24.

In the EXITD instruction, the registers are restored from the stack in accordance with the register list, and the SP is restored from the FP to release the local variable area, then after restoring the old FP from the stack and returning from the subroutine, adisp value is added to the SP value to release the subroutine parameter. In the register list of the EXITD instruction, as shown in FIG. 24, the registers R14 and R15 can not be designated.

In the EXITD instruction format, there are an E format which designates an adjsp value by an 8-bit immediate value and a G format which designates by a general addressing mode.

(3) "Configuration of Function Block"

Figure 25:
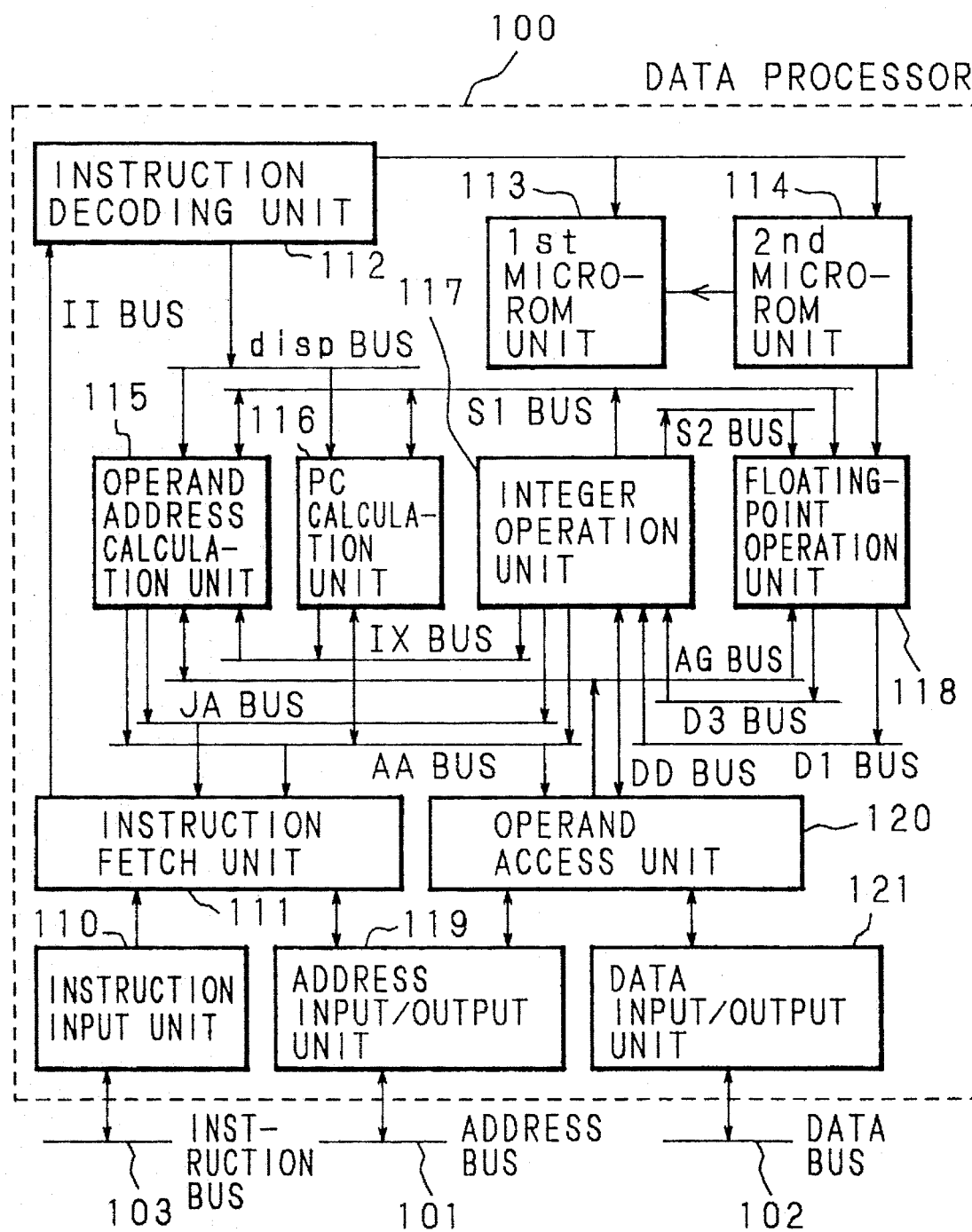

FIG. 25 is a block diagram showing a configuration of the data processor of the present invention.

The interior of the data processor of the present invention is functionally divided roughly into an instruction input unit 110, an instruction fetch unit 111, an instruction decoding unit 112, a first micro ROM unit 113, a second micro ROM unit 114, an operand address calculation unit 115, a PC calculation unit 116, an integer operation unit 117, a floating-point operation unit 118, an address input/output unit 119, an operand access unit 120 and a data input/output unit 121.

The system configuration as abovementioned and shown in FIG. 1 can be realized by connecting the address input/output unit 119 to the address bus 101, the data input/output unit 121 to the data bus, and the instruction input unit 110 to the instruction bus 103.

(3.1) "Instruction Input Unit"

The instruction input unit 110 inputs instruction codes by 32 bits to the data processor of the present invention from the external instruction bus 103.

There are two access modes to the instruction cache 106. One is a single access mode wherein a 32-bits instruction code is accessed with respect to one address. Another is a quad access mode wherein four 32-bits instruction codes are continuously accessed by four times with respect to one address. In both cases, the instruction input unit 110 outputs the inputted instruction code to the instruction fetch unit 111.

(3.2) "Instruction Fetch Unit"

The instruction fetch unit 111 which comprises an address translation mechanism for an instruction address, a built-in instruction cache, an instruction TLB, an instruction queue and a controlling unit thereof.

The instruction fetch unit 111 translates the PC value of the instruction to be fetched next, fetches the instruction code from the built-in instruction cache, and outputs it to the instruction decoding unit 112. In the case where the built-in instruction cache misses, the instruction fetch unit 111 outputs the physical address to the address input/output unit 119 to request an instruction access for exterior, so that the instruction code inputted through the instruction input unit 110 is registered to the built-in cache.

The PC value of an instruction to be fetched next is calculated by a dedicated counter as the PC value of the instruction to be inputted to an instruction queue. In the case where a jump is taken, the PC value of a new instruction is transferred from the operand address calculation unit 115, PC calculation unit 116 or the integer operation unit 117.

A control circuit inside the instruction fetch unit 111 also executes address translation and updating of the instruction TLB by paging in the case where the instruction TLB misses.

Also, in the case where the data processor of the present invention is under the bus watch mode, an entry, which is hit by the physical address inputted through the address input/output unit 109, of the built-in instruction cache is made invalid.

(3.3) "Instruction Decoding Unit"

In the instruction decoding unit 112, basically, the instruction code is decoded in a 16-bit (half word) unit.

Figure 26:
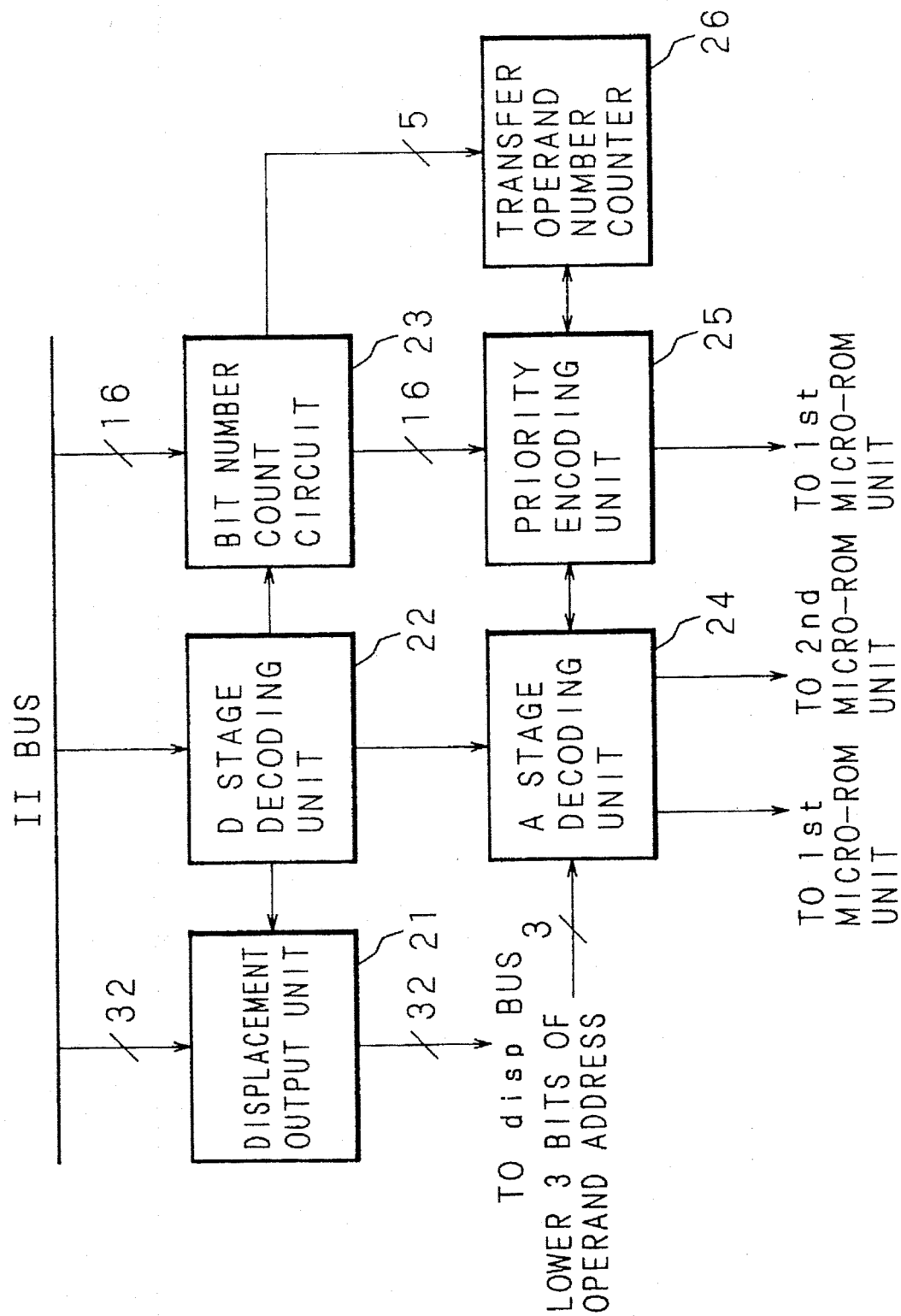
FIG. 26 is a block diagram showing detailed configuration of an instruction decoding unit of a data processor of the present invention.

In this block, as shown in FIG. 26, a decoder for decoding the operation code, a D stage decoding unit 22 for decoding an addressing mode, a displacement output unit 21 for processing displacement and immediate value in accordance with the addressing mode and a bit number count circuit 23 which counts the number of bits ("1") set and included in the register list are included.

In addition, an A stage decoding unit 24 for further decoding the output of the D stage decoding unit 22 to output an entry address of a micro-ROM, a priority encoding unit 25 for encoding register numbers corresponding to the bits set in the register list and a transfer operand number counter 26 are also included. These blocks are for decoding the latter instruction stage.

The instruction code outputted from an instruction fetching unit 111 is decoded by 0 to 6 bytes per one clock by pipe-lining. Among the decoded results, information related to operation in the integer operation unit 117 is outputted to a first micro-ROM unit 113, information related to operation in a floating point operation unit 118 is outputted to a second micro-ROM unit 114, information related to the operand address calculation is outputted to an operand address calculation unit 115 and information related to the PC calculation is outputted to a PC calculation unit 116.

(3.4) "First Micro ROM Unit"

The first micro ROM unit 113 comprises a micro ROM for storing microprograms which mainly controls the integer operation unit 117, a microsequencer, and a microinstruction decoder. A microinstruction is read out from the micro ROM within one clock cycle. The microsequencer accepts processings of exception, interruption, and trap (these three are called EIT) in addition to the sequential processings of the microprograms corresponding to each EIT, besides the sequential processing for execution of the microprogram relating to instruction execution.

To the first micro ROM unit 113, there are inputted interruption independent of the instruction code and branch condition of the microprogram by the result of integer operation execution.

Output of the microdecoder of the first micro ROM unit 113 is mainly given to the integer operation unit 117, but some information is outputted also to other blocks at execution of jump instruction and acceptance of execution.

(3.5) "Second Micro ROM Unit"

In the second micro ROM unit 114, a micro ROM in which various microprogram routines for controlling a floating-point operation unit 118 are stored, a microsequencer, a microinstruction decoder and so on are included. One microinstruction is read from the micro ROM in one clock cycle. The microsequencer also processes the exception related to the floating-point operation besides the sequence processing specified by the microprogram relating to instruction execution, and when the unmasked floating point exception is detected, requests the exception processing to the first micro ROM unit 113. The microsequencer of the second micro ROM unit 114 operates in parallel to the microsequencer of the first micro ROM unit 113, and controls the floating-point operation unit 118 in parallel to the integer operation unit 117.

To the second micro ROM unit 114, flag information resulted from the floating-point operation execution is also inputted.

Though output of the microdecoder of the second micro ROM unit 114 is mainly outputted to the floating-point operation unit 118, a part of information such as detection of the exception related to the floating-point operation is also outputted to the other functional blocks.

(3.6) "Operand Address Calculation Unit"

The operand address calculation unit 115 is controlled in hardwired logic by information on operand address calculation outputted from the addressing mode decoder of the instruction decoding unit 112. In this operand address calculation unit 115, operand address calculation other than the memory access for the memory indirect addressing, and jump target address calculation of the jump instruction are executed.

The result of operand address calculation is sent to the integer operation unit 117. In pre-jump processing at the completion of operand address calculation, the result of jump target address calculation is outputted to the instruction fetch unit 111 and the PC calculation unit 116.

An immediate value operand is outputted to the integer operation unit 117 and the floating-point operation unit 118. The values of the general-purpose register and the program counter required for address calculation are inputted from the integer operation unit 117 or the PC calculation unit 116.

(3.7) "PC Calculation Unit"

The PC calculation unit 116 is controlled in hardwired logic using information on PC calculation outputted from the instruction decoding unit 112. The PC calculation unit 116 calculates the PC value of an instruction. The data processor of the present invention has a variable-length instruction set, and the length of that instruction can be found only after the instruction is decoded. For this reason, the PC calculation unit 116 generates the PC value of the next instruction by adding the length of the instruction outputted from the instruction decoding unit 112 to the PC value of the instruction in decoding.

The result of calculation in the PC calculation unit 116 is outputted as the PC value of each instruction together with the result of decoding of the instruction.

In pre-branch processing at the instruction decoding stage, an address of branch destination instruction is calculated by adding a branch displacement outputted from the instruction decoding unit 11 and the PC value.

Also, the PC calculation unit 116 is provided with a PC stack for holding a copy of PC value, which is push to the stack at executing a jump-to-subroutine-instruction, of return destination from the subroutine. The PC calculation unit 116, for the return-from-subroutine-instruction, executes processing of generating an address of pre-return destination by reading out the return destination PC value from the PC stack.

(3.8) "Integer Operation Unit"

The integer operation unit 117 is controlled by the microprogram stored in a micro ROM of the first micro ROM unit 113, and executes operations necessary for realizing the function of each integer operation instruction, using the register file and arithmetic unit in the integer operation unit 117. In the register file, a general register and a working register are included.

In the integer operation unit 117, a processor status word (PSW) including a flag which is varied by the result of integer operation and the bits which decide the external interruption mask level, and the buffer memory control register are included.

When an operand to be calculated by an instruction is an address or an immediate value, the immediate value or calculated address is inputted from the operand address calculation unit 115. Also, when an operand address to be calculated is data on the memory, its address calculated in the address calculation unit 115 is outputted to the operand access unit 120, and the data fetched from a built-in data cache or the outside is inputted to the integer operation unit 117.

In operation, in the case where the built-in data cache, external data caches 107, 108 or the main memory 109 must be read, the integer operation unit 117 outputs the address to the operand access unit 120 and fetches target data under the control of the microprogram.

When it is necessary to store the operation result in the data buffer, external data caches 107, 108 or the main memory 109, the integer operation unit 117 outputs the address and data to the operand access unit 120 under the control of the microprogram. At this time, from the PC calculation unit 116, the PC value of the instruction executing the storing operation is outputted to the operand access unit 120.

When external interruption and exception are processed and the integer operation unit 117 receives the new instruction address, the integer operation unit 117 outputs the new instruction address to the instruction fetch unit 111 and the PC calculation unit 116.

(3.9) "Floating Point Operation Unit"

The floating-point operation unit 118 is controlled by the microprogram stored in a micro ROM of the second micro ROM unit 114, and executes operations necessary for realizing the function of each floating-point operation instruction, using the register file and operation device in the floating-point operation unit 118. Also, the floating-point operation unit is provided with a floating-point operation mode control register FMC which set a mode of the rounding method of flowing-point operation and detection allowance of floating-point operation exception.

When an operand to be calculated by an instruction is an immediate value, the immediate value is inputted to the floating-point operation unit 118 from the operand address calculation unit 115. When an operand to be calculated by an instruction is data on the memory, the address calculated in the address calculation unit 115 is outputted to the operand access unit 120, and the operand fetched from the built-in data cache or the outside is inputted to the floating-point operation unit 118.

When it is necessary to store the operand in the built-in data cache, external data caches 107, 108 or the main memory 109, the floating-point operation unit 118 outputs data to the operand access unit 120 under the control of the microprogram. In storing operation, the floating-point operation unit 118 and the integer operation unit 117 operate in cooperation with each other to output the operand address from the integer operation unit 117, and the operand itself from the floating-point operation unit 118 to the operand access unit 120. At this time, from the PC calculation unit 116, the PC value of the instruction executing the storing operation is outputted to the operand access unit 120.

(3.10) "Operand Access Unit"

An operand access unit 120 includes the operand address translation mechanism, the data buffer, a data TLB, a store buffer and an operand breakpoint register and their control units. In addition, the data buffer operates as an built-in data cache or a memory for saving context by changing over the modes.

In the case where the data buffer is made to be operated as the built-in data cache, when loading data, the operand access unit 120 translates the logical address of data to be loaded outputted from the operand address calculation unit 115 or the integer operation unit 117 into the physical address, fetches data from the data buffer and outputs it to the integer operation unit 117 or the floating-point operation unit 118.

When a data cache miss occurs, the physical address is outputted to the address input/output unit 119, and the data access to the outside is required and data inputted through the data input/output unit 121 is registered in the built-in data cache.

When storing the data, the logical address of data to be stored outputted from the integer operation unit 117 is transferred into the physical address, and data outputted from the integer operation unit 117 or the floating-point operation unit 118 is stored in the built-in data cache, and the physical address is outputted to the address input/output unit 119 through the store buffer and the data is outputted to the outside through the data input/output unit 121.

When a miss occurs in the storing operation, built-in data cache is not updated. In the store buffer, data to be stored and its address, and more over, the PC value of the instruction executing the storing operation are managed in a set. The storing operation in the store buffer is managed in a first-in first-out (FIFO) manner.

Address translation by paging for the data TLB miss and the update of the data TLB are also performed by the control circuit in the operand access unit 120. It is also checked whether or not the memory access address is in an I/O area mapped in the memory.

When the data buffer is made to be operated as the built-in data cache, in the case where the data processor of the present invention is under a bus watching mode, the operand access unit 120 invalidates the entry of the data buffer hit by the physical address inputted through the address input/output unit 119.

(3.11) "Address Input/Output Unit"

The address input/output unit 119 outputs the address outputted from the instruction fetch unit 111 and the operand access unit 120 to the outside of the data processor 100 of the present invention. The address is outputted in accordances with a bus protocol defined in the data processor 100 of the present invention.

The bus protocol is controlled by an external bus control circuit in the address input/output unit 119. In the external bus control circuit, bus access exception and external interruption are also received.

When external device other than the data processor 100 of the present invention is a bus master and the data processor 100 of the present invention is under the bus watching mode, the address input/output unit 119 fetches the address outputted on the address bus 101 when the external device executes the data write cycle, and transfers to the instruction fetch unit 111 and the operand access unit 120.

(3.12) "Data Input/Output Unit"

The data input/output unit 121, at operand loading operation, fetches data from the data bus 102 and transfers it to the operand access unit 120, and at operand storing operation, outputs the operand outputted from the operand access unit 120 to the data bus 102.

As the accessing method of the data caches 107, 108, there are a single access mode in which a 64-bit data is accessed for one address, and a quad access mode in which four 64-bit data are accessed continuously for one address, in either case, the data input/output unit 121 inputs and outputs the data between the operand access unit 120 and the external memory.

(4) "Pipeline Processing"

The data processor 100 of the present invention performs the pipeline processing of the instruction and operates very efficiently, by effective accessing of the memory using various buffer memories, the instruction bus 103 and the data bus 102.

Here, a pipeline processing method of the data processor 100 of the present invention will be described.

(4.1) "Pipeline Mechanism"

Figure 27:
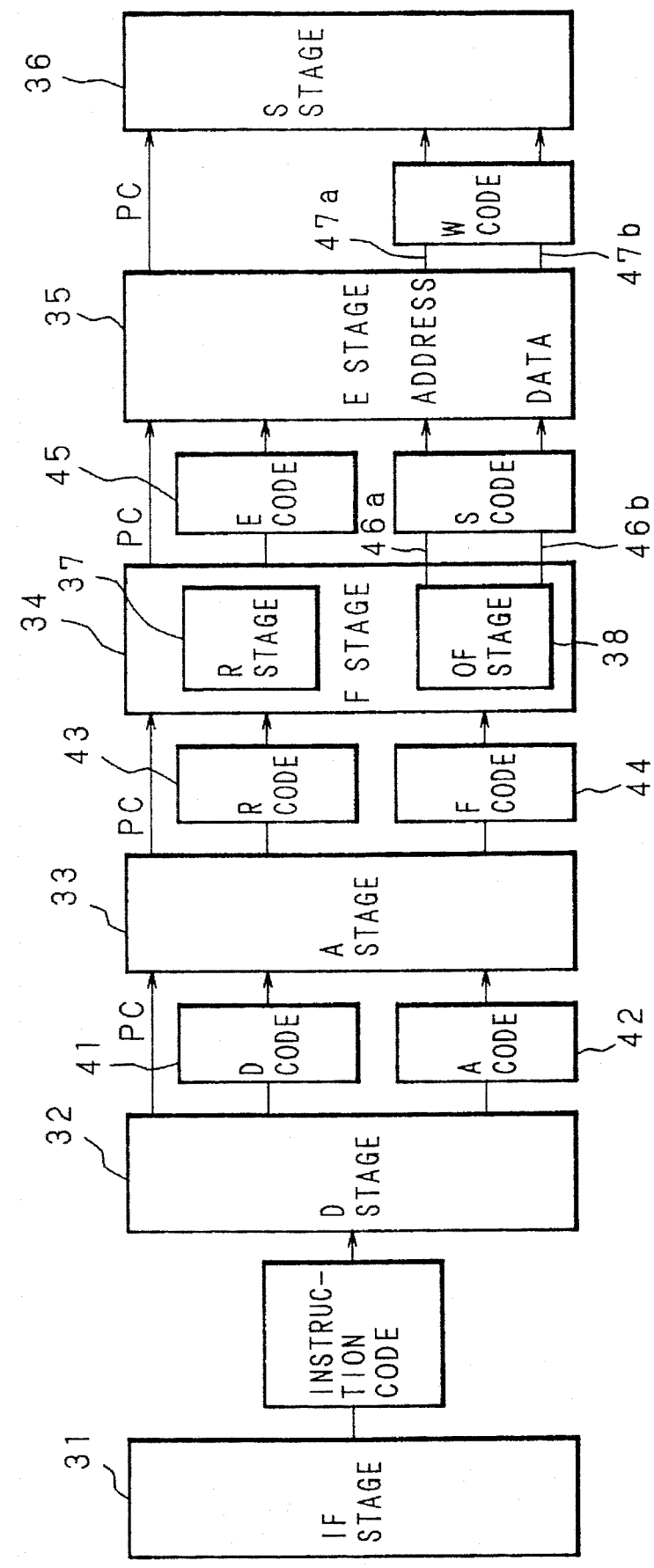
FIG. 27 is a schematic diagram for explaining respective stages of a pipelining mechanism of a data processor of the present invention.

A pipeline processing mechanism of the data processor 100 of the present invention is constituted as schematically in FIG. 27.

The pipeline processing is executed in six-stage configuration of an instruction fetch stage (IF stage) 31 which prefetches instructions, a decoding stage (D stage) 32 for decoding the instruction, an operand address calculation stage (A stage) 33 which performs address calculation of the operand, an operand fetch stage (F stage) 34 which performs the micro ROM access (particularly referred to as an R stage 37) and the operand prefetch (particularly referred to as an OF stage 38), an execution stage (E stage) 35 for executing the instruction and a store stage (S stage) 36 which stores the memory operand. In addition, in the S stage 36, there is a 3-entry store buffer.

Each stage operates independently of the other stages and, theoretically, the six stages operate completely independently.

Each stage other than the S stage 36 performs one processing in one clock cycle at a minimum. The S stage 36 performs one operand storing in two clock cycle at a minimum. Thus, in the case where there is no memory operand storing, theoretically, the pipeline processing is proceeded in every clock cycle.

In the data processor of the present invention, though there is the instruction which can not be processed by only one basic pipeline processing such as the memory-memory operation or the memory indirect addressing, it is so constituted that the balanced pipeline processing be also performed for these processings if possible.

For the instruction having a plural number of memory operands, the pipeline processing is performed by decomposing into plural internal codes (step code) in the decoding stage in response to the number of memory operands.

Information given to the D stage 32 from the IF stage 31 is the instruction code itself.

Information given to the A stage 33 from the D stage 32 are, a code (referred to as a D code 41) related to the operation specified by the instruction, a code (referred to as an A code 42) related the operand address calculation and a program counter value (PC) of the instruction being processed.

Information given to the F stage 34 from the A stage 33 are, an R code 43 including the entry address of the microprogram routine and parameters to the microprogram, an F code 44 including the operand address and accessing indicating information, and the program counter (PC) value of the instruction being processed.

Information given to the E stage 35 from the F stage 34 are, an E code 45 including operation control information and literal, S codes (46a, 46b) including the operand and its address and the PC value of the instruction being processed. The S codes 46a, 46b comprise an address 46a and data 46b.

Information given to the S stage 36 from the E stage 35 are W codes 47a, 47b which are the operation results to be stored and the PC value of the instruction outputting the operation results. The W codes 47a, 47b comprise an address 47a and data 47b.

An EIT detected in the stages before the E stage 35 does not start EIT processing until the code thereof reaches the E stage 35. It is because that, only the instruction processed in the E stage 35 is the instruction in the execution step, and the instruction processed in the IF stage 31 through F stage 34 is still not in the execution step. Accordingly, detection of the EIT before the E stage 35 is registered in the step code and just transmitted to the next stage. The EIT detected in the S stage 36 is received at the time point where execution of the instruction being processed in the E stage 35 is completed or at cancellation of the processing of the instruction, and restored to the E stage 35 for processing.

(4.2) "Processings in Each Pipeline Stage"

The input/output step codes to respective pipeline stages are named, as shown in FIG. 25, for the sake of convenience. In the step codes, there are two kinds, the one which becomes the entry address of microprogram and its parameters, and the other which becomes the operand to be processed in the E stage 35. Between the D stage 32 and the S stage 36, the PC value of the instruction being processed is received and given.

(4.2.1) "Instruction Fetch Stage"

In the instruction fetch stage (IF stage) 31, the instruction fetch unit 111 is operated. The instruction fetch unit 111 fetches the instruction from the built-in instruction cache or the outside and inputs it to an instruction queue, and outputs the instruction code to the D stage 32 in a unit of 2 to 6 bytes. Input of instructions to the instruction queue is performed in a unit of aligned 4 bytes.

When the instruction fetch unit 111 fetches the instruction from the outside under a single access mode, it requires at least 2 clock cycles for the aligned 4 bytes.

Under a quad access mode, at least 5 clock cycles are necessary for 16 bytes.

When the built-in instruction cache is hit, fetch is possible in 1 clock cycle for the aligned 8 bytes.

Outputs of the instruction queue is variable by every 2 bytes, and can be outputted to 6 bytes in 1 clock at a maximum. Right after the jump, the instruction queue may be by-passed and the 2-byte instruction base part is transferred directly to the instruction decoder.

Translation of the logical address of the instruction into the physical address, control of the built-in instruction cache and instruction TLB, management of the prefetch of instructions, and control of the instruction queue are performed in the IF stage 31.

(4.2.2) "Instruction Decoding Stage"

The instruction decoding stage (D stage) 32 decodes the instruction code inputted from the IF stage 31. The instruction code is decoded once in one clock cycle using an FHW decoder, and NFHW decoder and an addressing mode decoder in the instruction decoding unit 112, and 0 to 6-byte instruction code is consumed in one decoding (the instruction code is not consumed in the output processing of the step code including the return destination address of the return-from-subroutine-instruction).

In one decoding, the D stage 32 outputs an A code 42 as address calculation information and a D code 41 as an intermediate decoding result of the operation code to the A stage 33.

In the D stage 32, control of the PC calculation unit 116 of each instruction and the output processing of the instruction code from the instruction queue are performed.

In the D stage 32, pre-jump processing is performed for the branch instruction or return-from-subroutine-instruction. For the unconditional branch instruction which made pre-jumping, the D code 41 and A code 42 are not outputted and the instruction processing is completed in the D stage 32.

(4.2.3) "Operand Address Calculation Stage"

Processing of an operand address calculation stage (A stage) 33 is roughly divided into two. First is the post-stage decoding processing of the operation code using the second decoder of the instruction decoding unit 112, and second one is the calculation processing of the operand address in the operand address calculation unit 54.

In the second-stage decoding processing of the operation code, the D code 41 is inputted and the R code 43 including the address of the write reservation of the register and memory, the entry address of microprogram routine, and parameters for the microprogram is outputted. Incidentally, the write reservation of the register and memory is for preventing, when the content of the register or the memory referred at address calculation is rewritten by the preceding instruction in the pipeline, the wrong address calculation.

In the operand address calculation processing, the A code 42 is inputted and in accordance with the A code 42, the operand address is calculated in the operand address calculation unit 54 to output the calculation result as the F code 44. For the jump instruction, the jump destination address is calculated and the pre-jump processing is executed. At this time, the write reservation is checked when the register is read in connection with the address calculation, and when the preceding instruction has been indicated that there is the reservation because the writing processing for the register or memory is not completed, the following instruction is in the waiting state until the writing processing of the preceding instruction is completed in the E stage 35.

In the A stage 33, for the jump instruction which has not pre-jumped in the D stage 32, the pre-jump processing is performed. For a jump to the register indirect address, pre-jumping is performed in the A stage 33.

(4.2.4) "Micro ROM Access Stage"

Processing of an operand fetch stage (F stage) 34 is also divided roughly into two. First is the access processing of the micro ROM, particularly referred to as an R stage 37, and second one is the operand prefetch processing, particularly referred to as an OF stage 38. The R stage 37 and the OF stage 38 do not necessarily operate simultaneously, the operation timing being different from each other depending upon miss and hit of the data cache, and miss and hit of data TLB.

The micro ROM access processing which is the processing in the R stage 37 is the micro ROM access and the microinstruction decode processing for generating the E code 45, which is the execution control code used in execution in the next E stage 35 for the R code 43.

In the case where one processing for the R code is decomposed into two or more microprogram steps, there may be the case where the first micro ROM unit 113 and the second micro ROM unit 114 are used in the E stage 35 and the next R code 43 is in the waiting state of micro ROM access. Micro ROM access for the R code 43 is performed when it is not performed in the E stage 35.

In the data processor 100 of the present invention, since a number of integer operation instructions are executed in one microprogram step and many floating-point operation instructions are executed in two microprogram steps, in practice, there is a high frequency of performing the micro ROM access sequentially for the R code 43.

(4.2.5) "Operand Fetch Stage"

The operand fetch stage (OF stage) 38 executes the operand prefetch processing of the aforesaid two processings in the F stage 34.

In the operand fetch stage 38, the logical address of the F code 44 is translated into the physical address by data TLB, and by the physical address, the built-in data cache is accessed to fetch the operand, which is combined with the logical address transferred as the F code 44 and outputted as the S codes 46a, 46b.

In one F code 44, even if the operand crosses an 8-byte boundary, the operand fetch equal or less than 8 bytes is fetched. In the F code 44, selection whether or not to access the operand is involved, and when the operand address itself or the immediate value calculated in the A stage 33 is transferred to the E stage 35, the operand prefetch is not performed and the content of F code 44 is transferred as the S codes 46a, 46b.

(4.2.6) "Execution Stage"

The execution stage (E stage) 35 operates with the E code 45 and the S codes 46a, 46b as inputs. The E stage 35 is the instruction executing stage, thus the processings performed in stages before and in the F stage 34 are all pre-processings for the E stage 35. When a jump is performed or the EIT processing is started in the E stage 35, the processings from the IF stage 31 to the F stage 34 are all repealed. The E stage 35 is controlled by the microprogram and executes the instruction by executing a series of microinstructions from the entry address of the microprogram routine specified in the E code 45.

In the E code 45, there are a code (particularly referred to as an EI code) which controls the integer operation unit 117, and a code (particularly referred to as an EF code) which controls the floating-point operation unit 118. The EI code and EF code are able to output independently, and at this time, in the E stage 35, the integer operation unit 117 and the floating-point operation unit 118 operate in parallel. For example, when executing the floating-point instruction having no memory operand in the floating-point operation unit 118, this operation is executed in parallel to the operation of the integer operation unit 117.

In both the integer operation and the floating-point operation, read-out of the micro ROM and execution of the microinstruction is executed in the pipeline processing. Accordingly, when the branch occurs in the microprogram, there is a space of one microstep. In the E stage 35, the write reservation for the register or memory performed in the A stage 33 is released after writing the operand.

Various interruptions are received directly in the E stage 35 at an interval of instructions, and the necessary processing is executed by the microprogram. The other various EIT processings are also performed in the E stage 35 by the microprogram.

When the operation result must be stored in the memory, the E stage 35 outputs the W codes 47a, 47b and the program counter value of the instruction performing the storing processing to the S stage 36.

(4.2.7) "Operand Store Stage"

The operand store stage 36 translates the logical address 47a of the W code into the physical address by data TLB, and stores the data 47b of the W code in the built-in data cache by above translated address. Simultaneously, the operand store stage 36 inputs the W codes 47a, 47b and the program counter value in the store buffer, and processes to store the data 47b of the W code to the external memory using the physical address outputted from the data TLB.

The operation of the operand store stage 36 is performed in the operand access unit 120, and also the address translation processing and the permuting processing of the data buffer, in the case where the data TLB or a data buffer miss occurred.

When the operand store stage 36 detects an EIT at the store processing of the operand, while holding the W codes 47a, 47b and the program counter value in the store buffer, the EIT is noticed to the E stage 35.

(4.3) "State control of Each Pipeline Stage"

Each pipeline stage includes an input latch and an output latch, and basically, operates independently of the other stages. Each of the stages, when the processing performed one before is completed, transfers the processing result to the input latch in the next stage from the own output latch, and starts the next processing when all of the input signals necessary for the next processing are ready in the input latch of the own stage.

That is, each stage starts the next processing when all of the input signals for the next processing outputted from the preceding stage become effective, and the processing result at that time point is transferred to the input latch of the later stage, and the output latch becomes empty.

All input signals must be ready at the timing immediately before each of the stages starts the operation. In the case where the input signals are not ready, this stage becomes the waiting state (input waiting). When transferring from the output latch to the input latch of the next stage, the input latch of the next stage must be empty. Even in the case where the next stage input latch is not empty, the pipeline stage is in the waiting state (output waiting). When the cache or the TLB misses or data interference occurs between the instructions being processed in the pipeline, a plural number of clocks are necessitated for the processing of one stage, results in delay of the pipeline processing.

(5) "Detailed Operation of High Functional Instruction"

The data processor 100 of the present invention has a function to execute multi-functional instructions at high speed, such as the LDM (Load Multi) instruction and STM (Store Multi) instruction which transfer a number of operands between the registers and memory, the ENTER instruction and EXITD instruction which are used at the entrance and exit of a subroutine in the high-level languages.

These multi-functional instructions are decomposed into a plurality of internal codes in the instruction decoding unit 112 and unwound on the pipeline. Here, a mechanism of the data processor 100 of the present invention which executes the multi-functional instructions at a high speed will be described exemplary by these four instructions.

(5.1) "Detailed Configuration of Instruction Decoding Unit"

FIG. 26 is a block diagram showing a detailed configuration of the instruction decoding unit 112 of a data processor 100 of the present invention.

In the LDM instruction, STM instruction, ENTER instruction and EXITD instruction, according to the output of the D stage decoding unit 22 shown in FIG. 26, a bit number count circuit 23 counts the number of bits set in the register list. At this time, in the ENTER instruction and the EXITD instruction, the bits corresponding to the registers R14 and R15 are masked and reset at input to the bit number count circuit 23.

Figure 28:
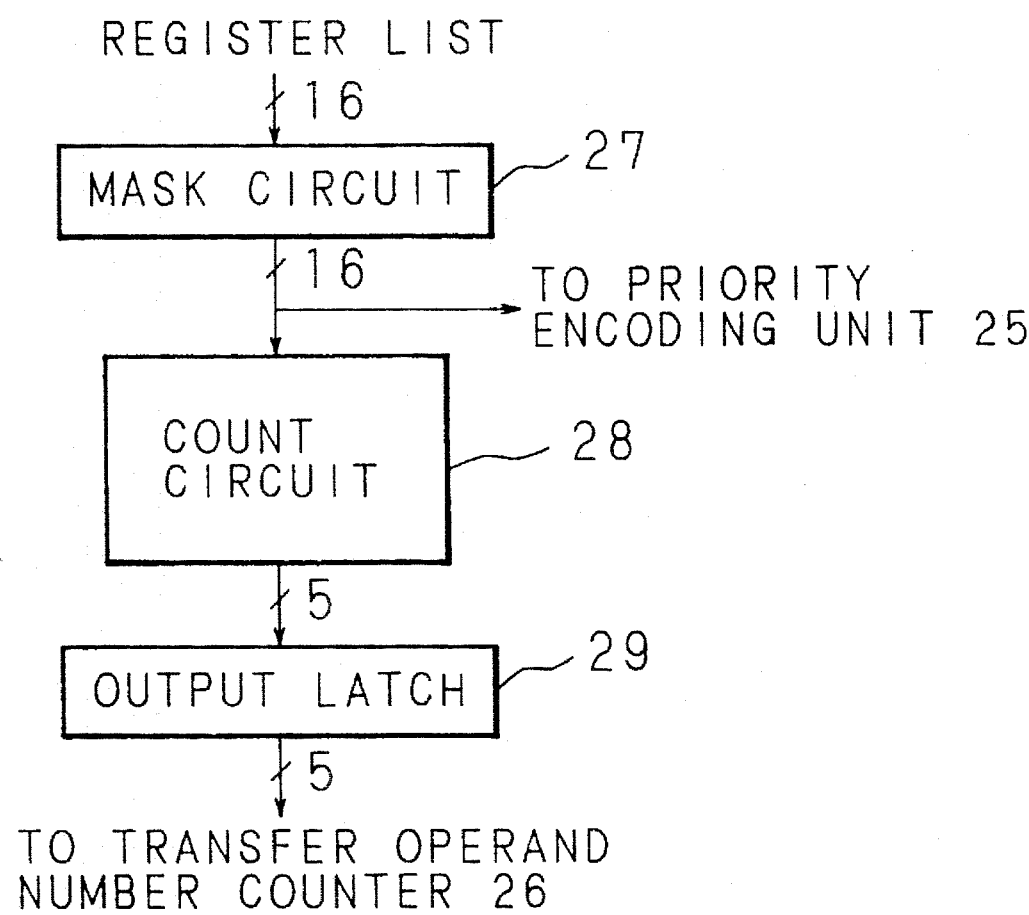
FIG. 28 is a block diagram showing an entire configuration of a data processor of the present invention.

FIG. 28 is a block diagram showing a detailed configuration of the bit number count circuit 23.

The inputted 16-bit register list, whose lower two bits or higher two bits are masked in a mask circuit 27 when necessary, is inputted to a count circuit 28. Output of the mask circuit 27 is also sent to the priority encoding unit 25. The count circuit 28 counts the number of bits set by the 16-bit bit string by a WALLANCE TREE and a ripple carry adder, and outputs the 5-bit calculated result to an output latch 29. The content of the output latch 29 is sent to a transfer operand number counter 26.

(5.2) "Detailed Configuration of Priority Encoder Unit"

The priority encoding unit 25 searches a first "1" or "0" or searches a field in which continuous two bits are all "1" or all "0".

Figure 29:
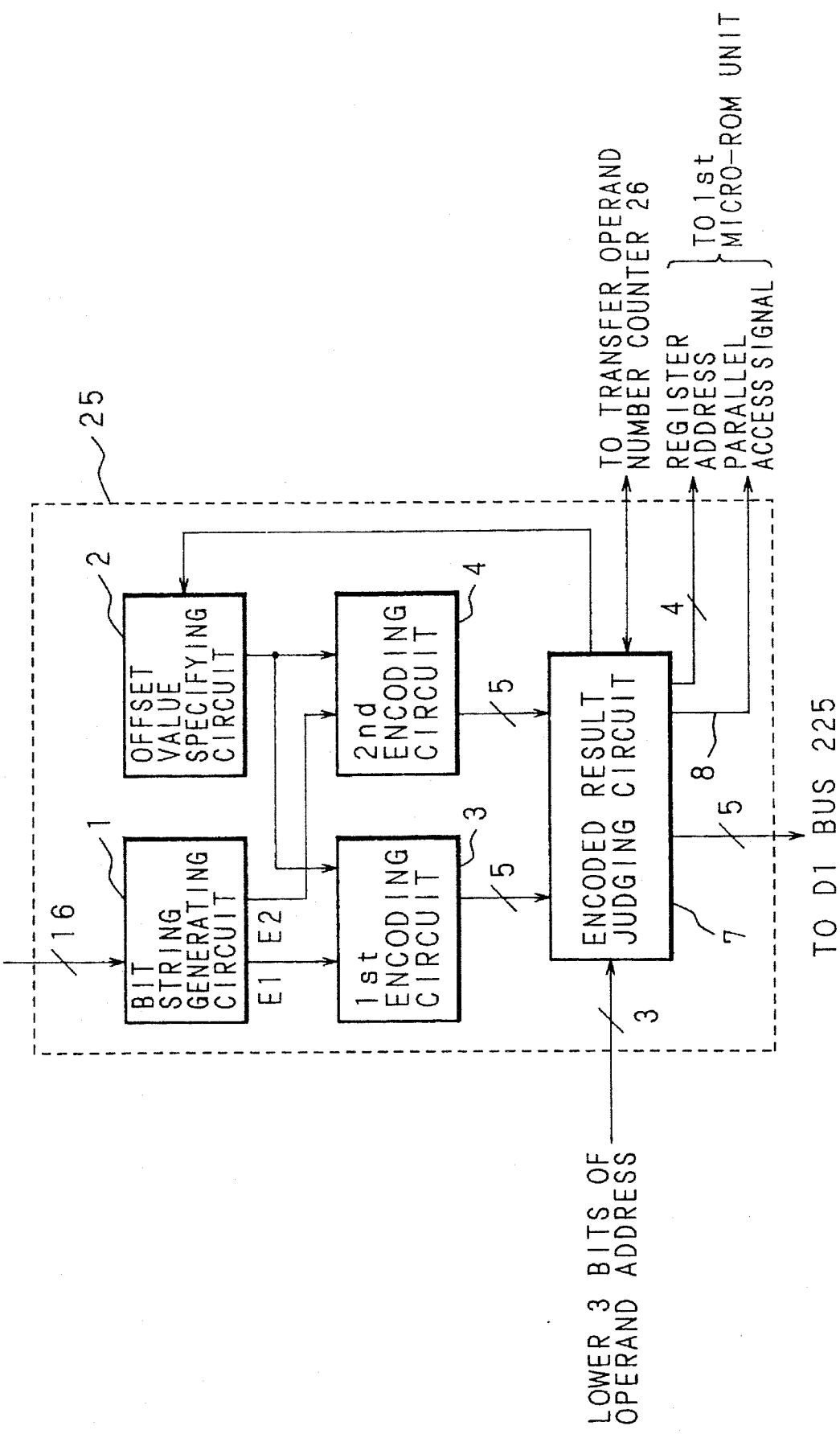
FIG. 29 is a block diagram showing a detailed configuration of a priority encoding unit of a data processor of the present invention.

FIG. 29 is a detailed block diagram of a priority encoding unit 25.

The priority encoding unit 25 is constituted by a bit string generating circuit 1, an offset value specifying circuit 2, two priority encoding circuits 3 and 4, an encoded result judging circuit 7, and so on.

The bit string generating circuit 1 includes, functions of holding 16-bit strings inputted from bit number count circuit 23, reversing the bit order and executing AND operation between the adjacent bits, and outputs the bit string thus converted to the first encoding circuit 3 and the second encoding circuit 4 as an E1 and E2.

Figure 30:
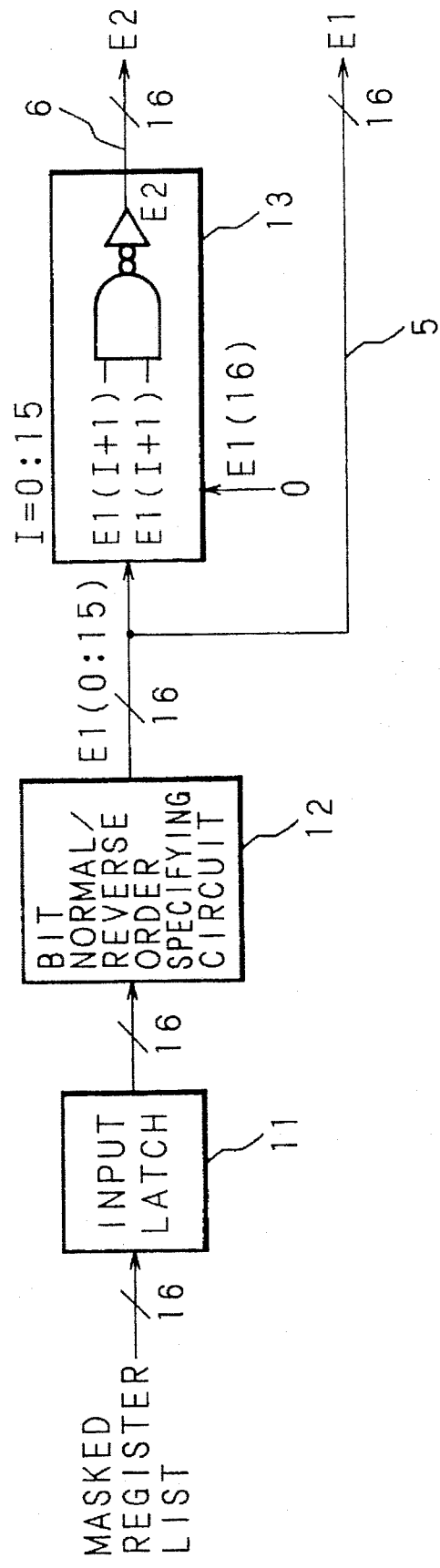
FIG. 30 is a block diagram showing a detailed configuration of a bit string generating circuit of a priority encoding unit of a data processor of the present invention.

FIG. 30 is a block diagram showing a detailed configuration of the bit string generating circuit 1.

Output of the input latch 11 is inputted to the first encoding circuit 3, the bit order being reversed, if necessary, in a bit normal/reverse order specifying circuit 12. Output from the bit normal/reverse order specifying circuit 12 is also inputted to the second encoding circuit 4, each of the bits being executed AND operation with the respective adjacent higher order side bit by an AND circuit 13.

The offset value specifying circuit 2 inputs the offset value outputted from the encoded result judging circuit 7, and adding "1" or "2" to the value to output the added result to the first encoding circuit 3 and the second encoding circuit 4.

The first encoding circuit 3 and the second encoding circuit 4 are a priority encoding circuit having a same circuit configuration, or a combinational logical circuit which searches the first "1" in the bit string inputted from the bit string generating circuit 1 after the bit position specified by the offset specifying circuit 2, and outputs the bit position number of the first "1".

Making encoded values outputted from the first encoding circuit 3 and the second encoding circuit 4 and the least significant three bits transferred from the operand address calculation unit 115 input, the encoded result judging circuit 7 outputs the encoded result and the value to be added to the offset value specifying circuit 2, and the register number and the parallel access signal 8 specifying whether the two registers should be accessed at the same time to the integer operation unit 117, and besides can output the value in which "1" and "0" of the output of the first encoding circuit 3 are reversed to the register address specifying circuit 218.

The parallel access signal 8 is asserted when all of the least significant three bits of the AA bus 122 are "0" and the encoded results of the first encoding circuit 3 and the second encoding circuit 4 are equal.

(5.3) "Detailed Configuration of Operand Address Calculation Unit and Integer Operation Unit"

Figure 31:
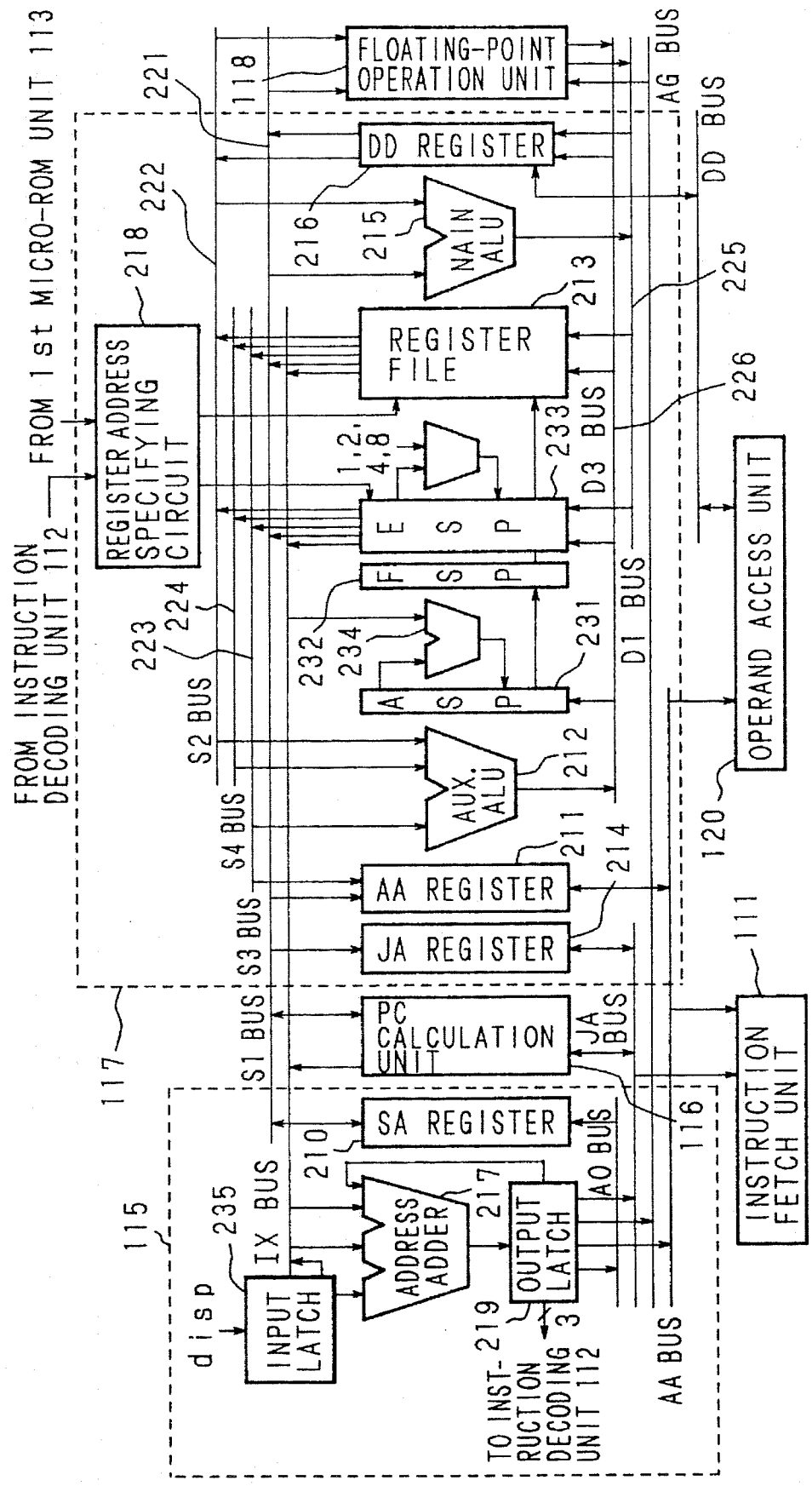
FIG. 31 is a block diagram showing a detailed configuration of an operand address calculation unit and an integer operating unit of a data processor of the present invention.

In FIG. 31, a detailed block diagram of the integer operation unit 117 and the operand address calculation unit 115 of a data processor 100 of the present invention are shown together with other portions.

In the operand address calculation unit 115, there are provided a 3-input address adder 217, its output latch 219, SA register 210 and an input latch 235 of a disp bus. In the address adder 217, a value transferred by an IX bus and a value of the input latch 235 of the disp bus which has been transferred from the instruction decoding unit 112 are added, and the added result is held in the output latch 219. The SA register is the register which holds an operand address and immediate value outputted to the integer operation unit 117 from the operand address calculation unit 115.

The integer operation unit 117 includes various arithmetic units and register files and various working registers. An AA register 211 is a register for outputting the address to an operand accessing unit 120 from the integer operation unit 117, and includes increment/decrement functions of "1", "2", "4" and "8" for the holding contents. A JA register 214 is a register for outputting a jump destination address of a jump instruction obtained in the integer operation unit 117 to a JA bus.

The register file 213 holds various data in the integer operation unit 117, and is coupled respectively to a main ALU 215 and an auxiliary ALU 212 through three 4-byte buses, operations such as addition and comparison related to operands on the two registers may be executed in the main ALU 215 and the auxiliary ALU 212.

The DD register 213 is an interface register for inputting and outputting data by the integer operation unit 117 and the operand access unit 120, and is connected to the operand access unit 120 through an 8-byte DD bus 123.

A register address designating circuit 218 controls reading and writing of the register file 213 in accordance with the register address designated by the first micro-ROM unit 113, and the register address designated by the priority encoding unit 25 of the instruction decoding unit 112, as indicated by the first micro-ROM unit 113.

ASP 231, FSP 232 and ESP 233 are working stack pointers corresponding to the pipeline stages. To the ASP 231, an adder 234 having an adding function with the value transferred by the IX bus and increment/decrement functions of "1", "2", "4" and "8" is attached. And ESP 233 has increment/decrement functions of "1", "2", "4" and "8".

(5.4) "Detailed Description of Register Address Specifying Circuit"

Figure 32:
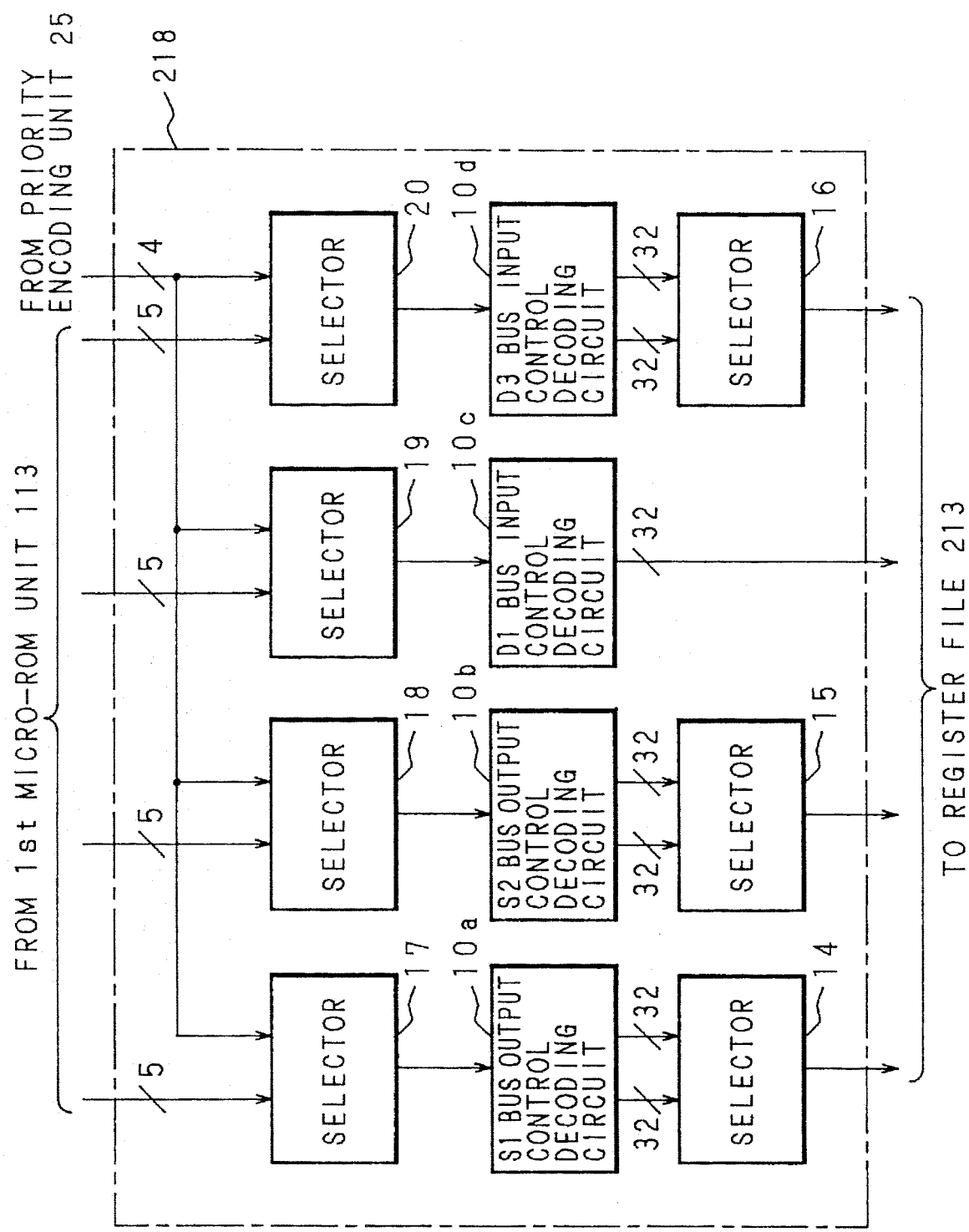
FIG. 32 is a block diagram showing a detailed configuration of a register address designating circuit of a data processor of the present invention.
Figure 34A:
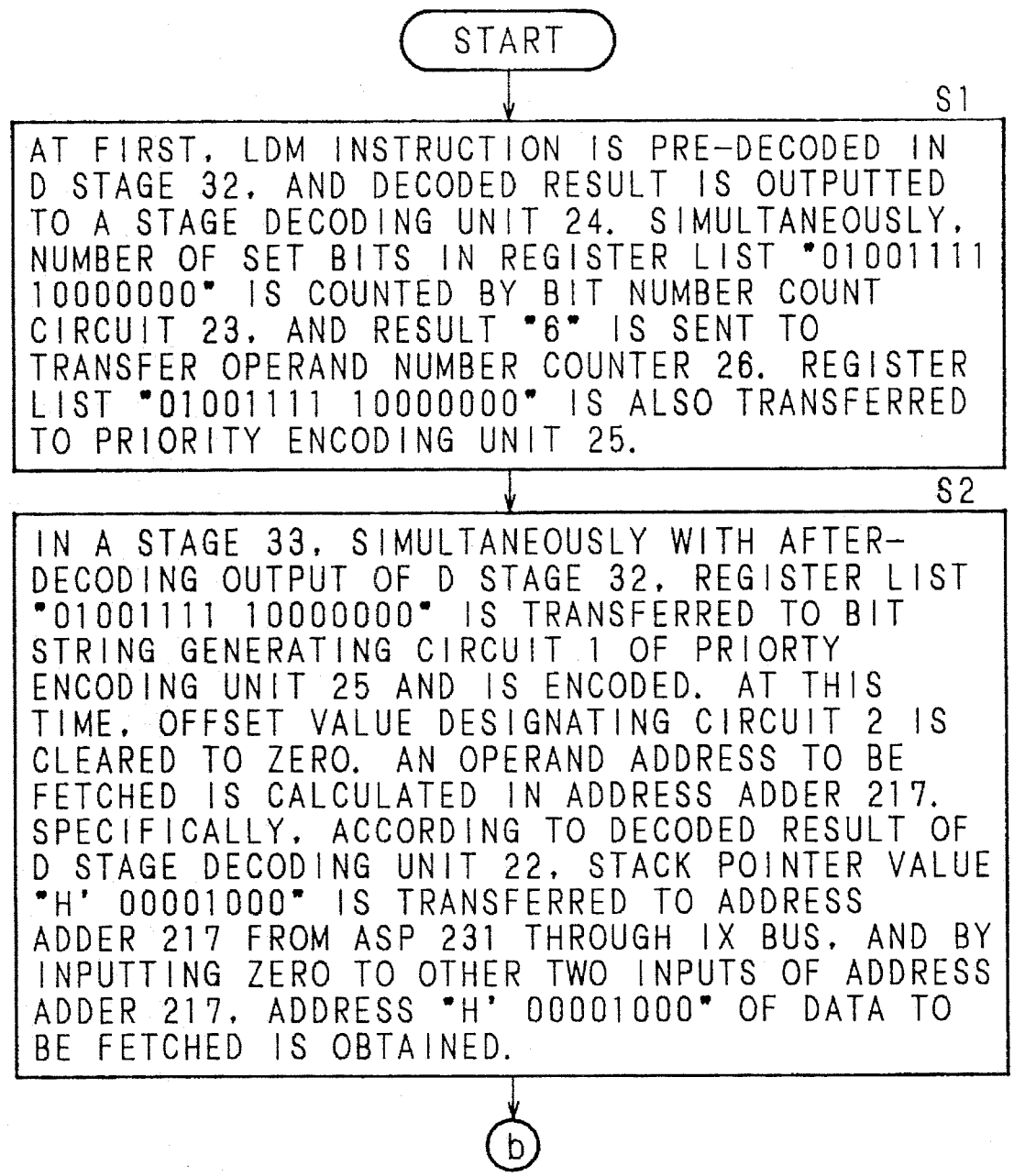
Figure 34B:
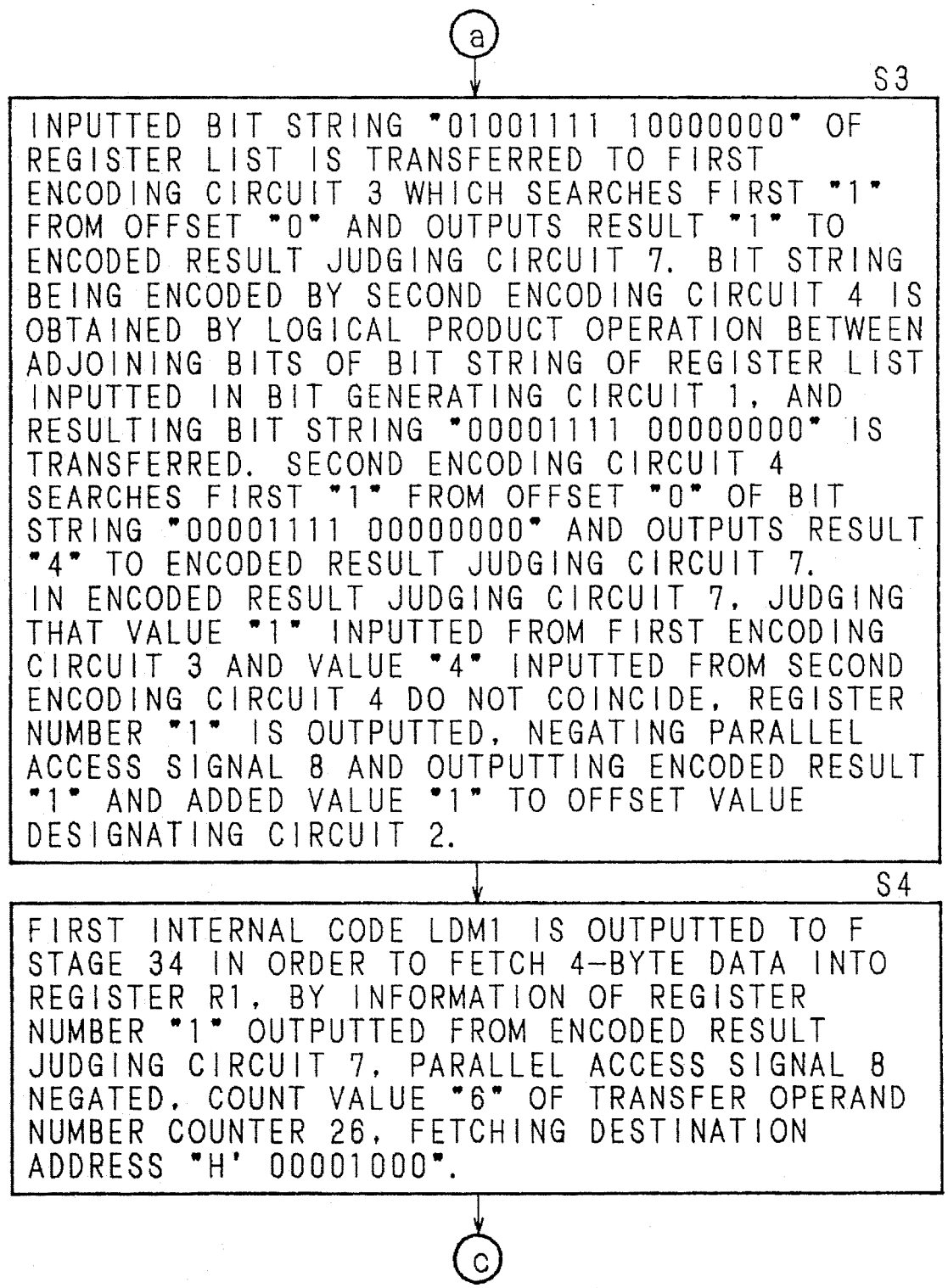
Figure 34E:
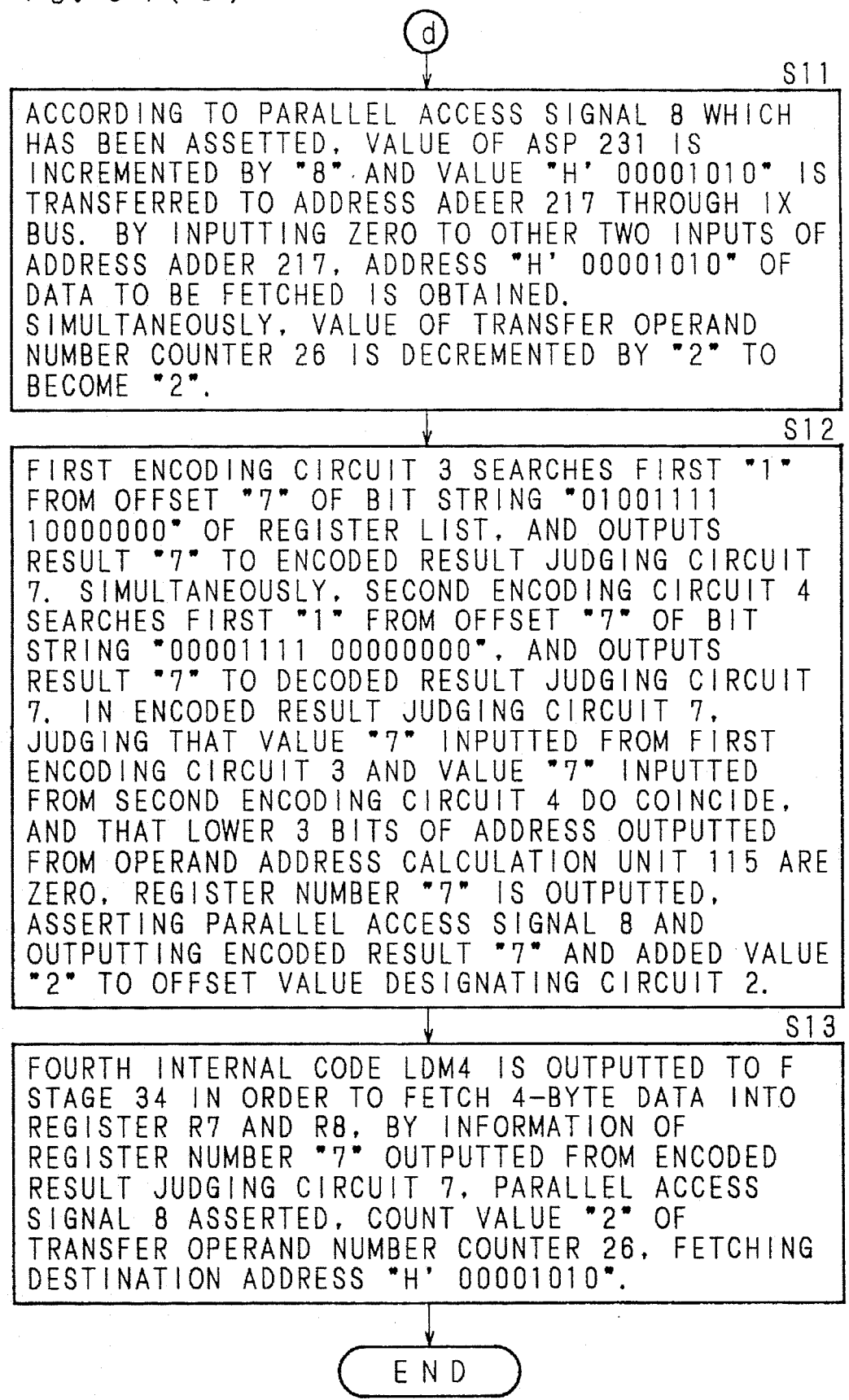

FIG. 32 is a block diagram showing a detailed configuration of a register address specifying circuit 218.

The register address specifying circuit 218 decodes a register address specified by the first micro-ROM unit 113 and a register number specified by the priority encoding unit 25 with use of decoding circuits 10a, 10b, 10c and 10d, and controls input/output between the register file 213 and the S1 bus 221, S2 bus 222, D1 bus 225, and D3 bus 226.

Either of the register addresses specified for each bus by the first micro-ROM unit 113 and the register number specified in the priority encoding unit 25 is selected by the selectors 17, 18, 19 and 20 and inputted to decoding circuits 10a, 10b, 10c and 10d, respectively.

In the data processor 100 of the present invention, since registers which input and output to each of the buses are controlled according to the register address outputted from the first micro-ROM unit 113 for simple instructions such as a move instruction or an add instruction, the register address is decoded in the decoding circuits 10a, 10b, 10c and 10d for each of the buses, and the register file 216 is accessed according to the output signal thereof, but for some of the multi-functional instructions, by shifting the control signal outputted from the decoding circuits 10a, 10b, 10c and 10d, the register file 213 is accessed by the decoded result different from the original decoded result.

In the case where the two registers are accessed in parallel in executing the multi-functional instructions, in the case of the S2 bus 222 and D3 bus 226, the decoded result is shifted to one bit higher order side, in order to access the register having one number larger than the register number specified by the priority encoding unit 25. This function is realized by that the selectors 15, 16 select control signal wire group through which the bit string of the decoded result of the decoding circuits 10b and 10d is shifted to one bit higher order side, and do not select the control signal wire group through which the bit string of the decoded result itself is outputted.

In the case where the two registers are accessed in parallel in executing the multi-functional instructions, which use the S1 bus 221, the decoded result of the decoding circuit 10a is shifted to one bit lower order side, in order to access the register having one number smaller than the register number specified by the priority encoding unit 25. This function is realized by that selector 14 selects control signal wire group through which the bit string of the decoded result of the decoding circuit 10a is shifted to one bit lower side and does not select the control signal wire group through which a bit string of the decoded result itself is outputted.

(5.5) "Operation of LDM Instruction"

Figure 35A:
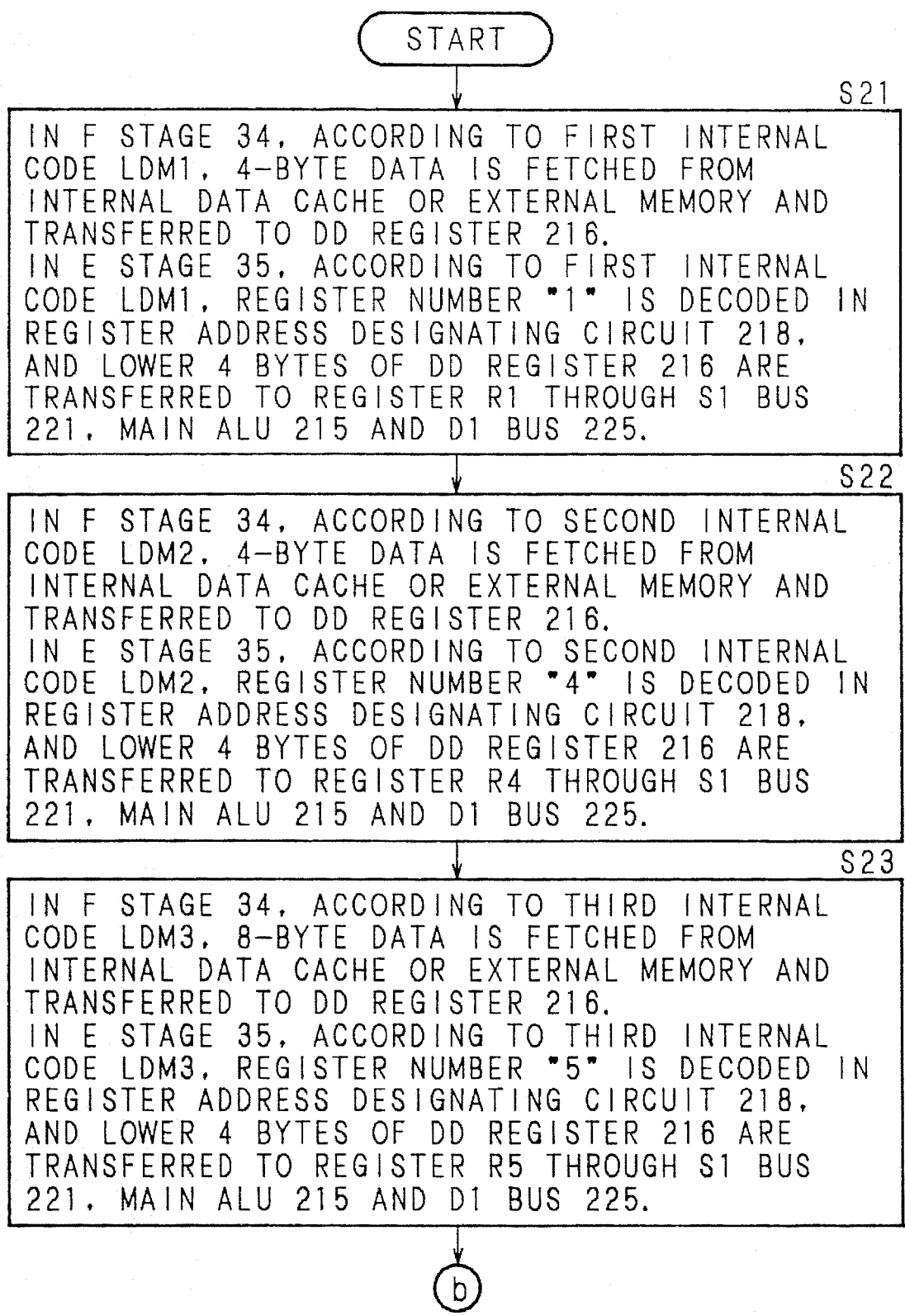
Figure 35B:
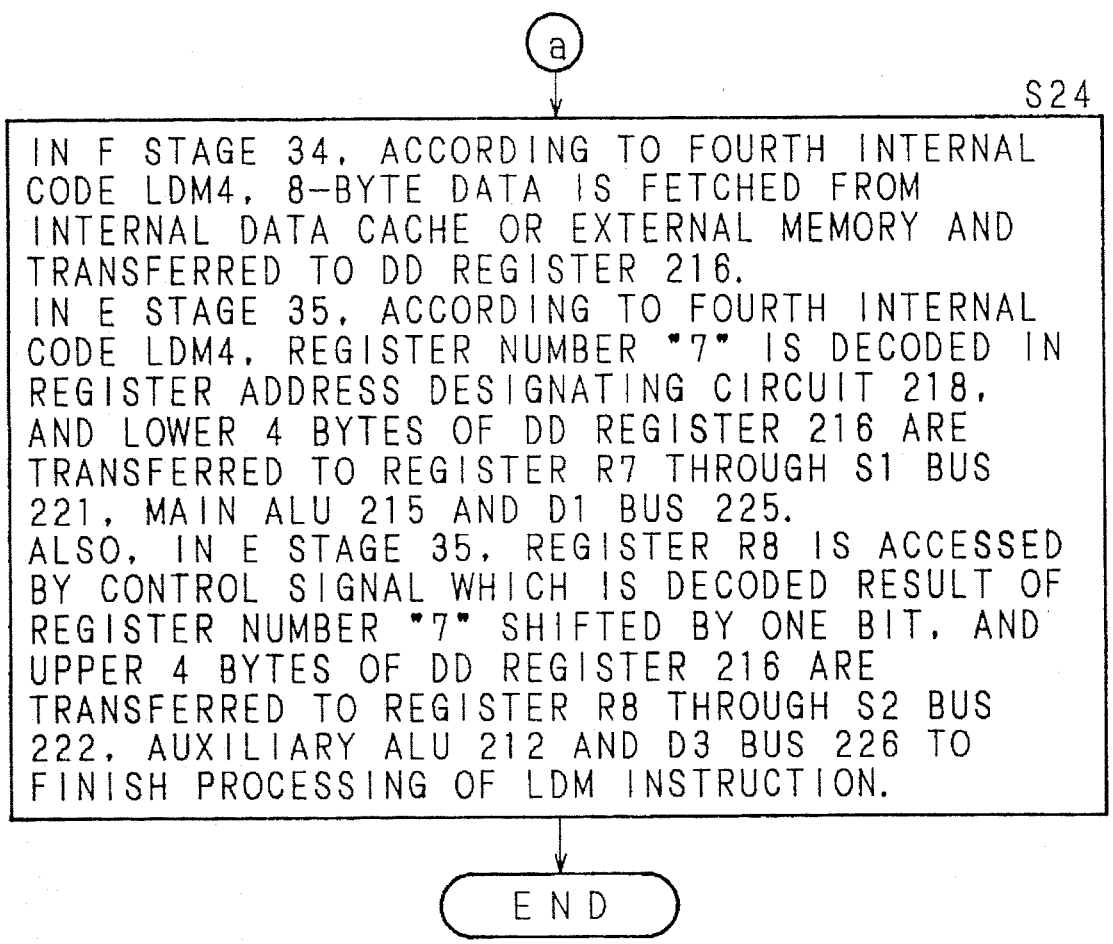
Figure 36:
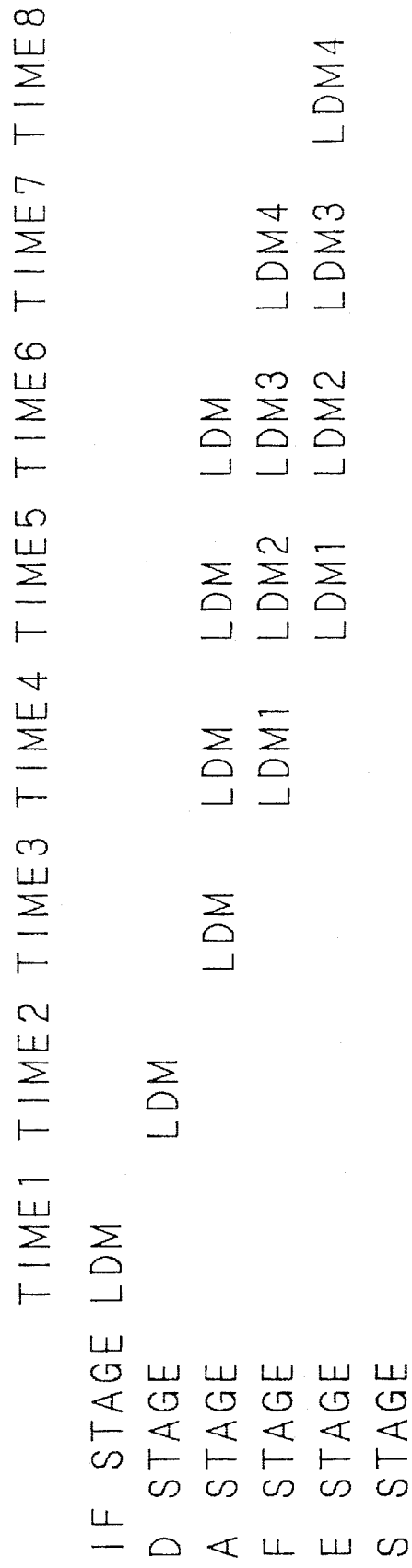
FIG. 36 is a time chart showing pipelining timings when executing specific example of LDM instruction of a data processor of the present invention.

FIG. 33 is a schematic diagram showing one example of operation code of the LDM instruction of a data processor of the present invention. This instruction is the instruction which loads six 4-byte data from a stack area onto six general purpose registers R1, R4, R5, R6, R7 and R8. In case of executing this instruction by the data processor 100 of the present invention, in the D stage 32 and A stage 33, the LDM instruction is decomposed into four internal codes in accordance with algorithms shown in flow-charts of FIGS. 34(a) through (e). Each of the decomposed codes is pipelined in the F stage 34 and the E stage 35. For respective codes, one micro-instruction is executed respectively in accordance with algorithms shown in flow charts of FIGS. 35(a) and (b) in the E stage. FIG. 36 is a conceptional view showing processing timings in case of pipelining the LDM instruction. In FIG. 36, LDM1, LDM2, LDM3, LDM4 are respectively the internal codes obtained by decomposing the LDM instruction for pipe-lining.

In the operation code of the LDM instruction shown in FIG. 33 specifically, the first internal code LDM1 pops out 4-byte data from the stack and loads onto the register R1, the second internal code LDM2 pops out 4-byte data from the stack and loads onto the register R4, the third internal code LDM3 pops out 8-byte data from the stack and loads onto the registers R5 and R6, and the fourth internal code LDM4 pops out 8-byte data from the stack and loads onto the registers R7 and R8 to finish the instruction.

In the following, the operation code of the LDM instruction will be specifically described according to flow charts shown in FIGS. 34(a) through (e), and flow charts shown in FIGS. 35(a) and (b).

The LDM instruction is, at first, pre-decoded in a D stage 32 by a D stage decoding unit 22, and the decoded result is outputted to the A stage decoding unit 24. Simultaneously, the number of bits ("1") set in the register list "01001111 10000000" is counted by the bit number count circuit 23, and the result "6" is given to a transfer operand number counter 26. The register list "01001111 10000000" is also transferred to the priority encoding unit 25 (Step S1).

In the A stage 33, simultaneously with after-decoding the output of the D stage decoding unit 22 by the A stage decoding unit 24, the register list "01001111 10000000" is transferred to a bit string generating circuit 1 of the priority encoding unit 25 and is encoded. At this time, an offset value designating circuit 2 is cleared to zero. An operand address to be fetched is calculated in the address adder 217. Specifically, according to the decoded result of the D stage decoding unit 22, the stack pointer value "H' 00001000" is transferred to the address adder 217 from the ASP 231 through the IX bus, and by inputting zero to the other two inputs of the address adder 217, the address "H' 00001000" of data to be fetched is obtained (Step S2).

The transfer operand number counter 26 detects the last internal code by calculating the remaining number of operands to be transferred. The detected result by the transfer operand number counter 26 is given to an encoded result judging circuit 7 of the priority encoding unit 25.

In this example, since an addressing mode of the operand to be fetched is a stack-pop mode, the address held in the ASP 231 is transferred intact to an output latch 219.

Next, a bit string "01001111 10000000" of the register list inputted is transferred to a first encoding circuit 3 which searches the first "1" from offset "0" and outputs the result "1" to the encoded result judging circuit 7. A bit string being encoded by a second encoding circuit 4 is obtained by logical product operation between adjoining bits of the bit string of the register list inputted in the bit generating circuit 1, and the resulting bit string "00001111 00000000" is transferred. The second encoding circuit 4 searches the first "1" from offset of the bit string "00001111 00000000" and outputs the result "4" to the encoded result judging circuit 7. In the encoded result judging circuit 7, judging that the value "1" inputted from the first encoding circuit 3 and the value "4" inputted from the second encoding circuit 4 do not coincide, the register number "1" is outputted, negating a parallel access signal 8 and outputting the encoded result "1" and added value "1" to the offset value designating circuit 2 (Step S3).

The first internal code LDM1 is outputted to the F stage 34 in order to fetch 4-byte data into register R1, by information of the register number "1" outputted from the encoded result judging circuit 7, parallel access signal 8 negated, a count value "6" of the transfer operand number counter 26, a fetching destination address "H' 00001000" (Step S4).

In the F stage 34, according to the first internal code LDMI, the 4-byte data is fetched from an internal data cache or an external memory and transferred to the DD register 216. In the E stage 35, according to the first internal code LDM1, the register number "1" is decoded in the register address designating circuit 218, and lower 4 bytes of the DD register 216 are transferred to the register R1 through the S1 bus 221, main ALU 215 and D1 bus 225 (Step S21).

According to the parallel access signal 8 which has been negated, the value of ASP 231 is incremented by "4" and the value "H' 00001004" is transferred to the address adder 217 through the IX bus. By inputting zero to the other two inputs of the address adder 217, an address "H' 00001004" of data to be fetched is obtained. Simultaneously, the value of the transfer operand number counter 26 is decremented by "1" to become "5" (Step S5).

The first encoding circuit 3 searches the first "1" from offset "2" of a bit string "01001111 10000000" of register list, and outputs the result "4" to the encoded result judging circuit 7. Simultaneously, the second encoding circuit 4 searches the first "1" from offset "2" of a bit string "00001111 00000000" and outputs the result "4" to the encoded result judging circuit 7. In the encoded result judging circuit 7, judging that the value "4" inputted from the first encoding circuit 3 and the value "4" inputted from the second encoding circuit 4 do coincide, and that lower 3 bits of the address outputted from the operand address calculation unit 115 are not zero, the register number "4" is outputted, negating the parallel access signal 8 and outputting the encoded result "4" and added value "1" to the offset value designating circuit 2 (Step S6).

The second internal code LDM2 is outputted to the F stage 34 in order to fetch 4-byte data into register R4, by the information of the register number "4" outputted from the encoded result judging circuit 7, parallel access signal 8 negated, count value "5" of the transfer operand number counter 26 and fetching destination address "H' 00001004" (Step S7).

In the F stage 34, according to the second internal code LDM2, the 4-byte data is fetched from an internal data cache or an external memory and transferred to the DD register 216. In the E stage 35, according to the second internal code LDM2, the register number "4" is decoded in the register address designating circuit 218, and lower 4 bytes of the DD register 216 are transferred to the register R4 through the S1 bus 221, main ALU 215 and D1 bus 225 (Step S22).

According to the parallel access signal 8 which has been negated, the value of the ASP 231 is incremented by "4", and the value "H' 00001008" is transferred to the address adder 217 through the IX bus. By inputting zero to the other two inputs of the address adder 217, an address "H' 00001008" of data to be fetched is obtained. Simultaneously, the value of the transfer operand number counter 26 is decremented by "1" to become "4" (Step S8).

The first encoding circuit 3 searches the first "1" from offset "5" of a bit string "01001111 10000000" of the register list, and outputs the result "5" to the encoded result judging circuit 7. Simultaneously, the second encoding circuit 4 searches the first "1" from offset "5" of a bit string "00001111 00000000", and outputs the result "5" to the encoded result judging circuit 7. In the encoded result judging circuit 7, judging that the value "5" inputted from the first encoding circuit 3 and the value "5" inputted from the second encoding circuit 4 do coincide, and that lower 3 bits of the address outputted from the operand address calculation unit 115 are zero, the register number "5" is outputted, asserting the parallel access signal 8 and outputting the encoded result "5" and added value "2" to the offset value designating circuit 2 (Step S9).

The third internal code LDM3 is outputted to the F stage 34 in order to fetch 4-byte data into register R5 and R6, by information of the register number "5" outputted from the encoded result judging circuit 7, the parallel access signal 8 asserted, the count value "4" of the transfer operand number counter 26 and the fetching destination address "H' 00001008" (Step S10).

In the F stage 34, according to the third internal code LDM3, 8-byte data is fetched from an internal data cache or an external memory and transferred to the DD register 216. In the E stage 35, according to the third internal code LDM3, the register number "5" is decoded in the register address designating circuit 218, and lower 4 bytes of the DD register 216 are transferred to the register R5 through the S1 bus S221, main ALU 215 and D1 bus 225 (Step S23).

Also, in the E stage 35, the register R6 is accessed by a control signal which is the decoded result of the register number "5" shifted by one bit, and upper 4 bytes of the DD register 216 are transferred to the register R6 through the S2 bus 222, auxiliary ALU 212 and D3 bus 226 (Step S23).

According to the parallel access signal 8 which has been asserted, the value of the ASP 231 is incremented by "8" and the value "H' 00001010" is transferred to the address adder 217 through the IX bus. By inputting zero to the other two inputs of the address adder 217, an address "H' 00001010" of data to be fetched is obtained. Simultaneously, the value of the transfer operand number counter 26 is decremented by "2" to become "2" (Step S11).

The first encoding circuit 3 searches the first "1" from offset "7" of a bit string "01001111 10000000" of the register list, and outputs the result "7" to the encoded result judging circuit 7. Simultaneously, the second encoding circuit 4 searches the first "1" from offset "7" of the bit string "00001111 00000000" and outputs the result "7" to the decoded result judging circuit 7. In the encoded result judging circuit 7, judging that the value "7" inputted from the first encoding circuit 3 and the value "7" inputted from the second encoding circuit 4 do coincide, and that lower 3 bits of the address outputted from the operand address calculation unit 115 are zero, the register number "7" is outputted, asserting the parallel access signal 8 and outputting the encoded result "7" and added value "2" to the offset value designating circuit 2 (Step S12).

The fourth internal code LDM4 is outputted to the F stage 34 in order to fetch 4-byte data into register R7 and R8, by information of the register number "7" outputted from the encoded result judging circuit 7, the parallel access signal 8 asserted, the count value "2" of the transfer operand number counter 26 and the fetching destination address "H' 00001010" (Step S13).

In the F stage 34, according to the fourth internal code LDM4, 8-byte data is fetched from an internal data cache or an external memory and transferred to the DD register 216. In the E stage 35, according to the fourth internal code LDM4, the register number "7" is decoded in the register address designating circuit 218, and lower 4 bytes of the DD register 216 are transferred to the register R7 through the S1 bus 221, main ALU 215 and D1 bus 225.

Also, in the E stage 35, the register R8 is accessed by a control signal which is the decoded result of the register number "7" shifted by one bit, and upper 4 bytes of the DD register 216 are transferred to the register R8 through the S2 bus 222, auxiliary ALU 212 and D3 bus 226 to finish processing of the LDM instruction (Step S24).

When a bit string is searched by the first encoding circuit 3 and the second encoding circuit 4 as stated above, though the both searched results do coincide in the register number "4, 5, 6", since the lower 3 bits of the operand address calculated result are not "0" in case of the register number "4", data are loaded to the registers R1 and R4 by 4 bytes for each operation, and data are loaded in parallel to the registers R5, R6 and R7, R8 respectively.

When the registers R5, R6 and R7, R8 are accessed at the same time, the parallel access signal 8 outputted from the encoded result judging circuit 7 is asserted. According to the parallel access signal 8, by selecting a control line through which a bit string obtained by shifting the bit string of the decoded result by one bit higher side is transferred, by a selector 16, a value is loaded onto a register having one number larger than the register number outputted from the encoded result judging circuit 7.

(5.6) "Operation of STM instruction"

In case of executing the STM instruction in which a destination addressing mode is other than a @-SP mode, since a register list of the same format as the LDM instruction is processed, operation of the bit number count circuit 23, priority encoding unit 25 and transfer operand number counter 26 are same as the case of LDM instruction. Also, in the register address designating circuit 218, since the register which is one address larger than the inputted register address is accessed as the register address outputted to an S2 bus 222, a control line through which a bit string obtained by shifting the bit string of the decoded result by one bit higher side is transferred, is selected by a selector 15.

In case of executing the STM instruction in which the destination addressing mode is the @-SP mode, since the format of a register list different from the LDM instruction is processed, the operation of the priority encoding unit 25 differs partially. In this case, though the value outputted from the first encoding circuit 3 is transferred intact to the offset value designating circuit 2 from the encoded result judging circuit 7, to the register address designating circuit 218, a value obtained by reversing "0" and "1" of the value outputted from the first encoding circuit 8 is outputted. That is, though the bit number itself which is searched and encoded is transferred to the offset value designating circuit 2, to the register number designating circuit 218, the register number corresponding to the bit number searched and encoded is outputted.

In this case, in the register address designating circuit 218, when the parallel access signal 8 is asserted, a value is outputted to the S2 bus 222 from the register of the register address inputted, and to the S1 bus 221, a value from the register which is one address smaller than the inputted register address is inputted. This function is effected by selecting a control line through which a bit string obtained by shifting the bit string of the decoded result by one bit lower side is transferred, by a selector 14.

For example, in the example of STM instruction whose operation code is shown in FIG. 37, a bit string which is to be searched in the first encoding circuit 8 is "00000001 11110010", and a bit string which is to be searched in the second encoding circuit 4 is "00000001 11100000". In the first encoding operation, a value "7" is inputted from both the first encoding circuit 3 and the second encoding circuit 4 to the encoded result judging circuit 7, and from the operand address calculation unit 115, "0" of the lower 3 bits of the address "H' 00001FF8" pre-decremented in the ASP 231 is transferred. The encoded result judging circuit 7 outputs the value "7" and added value "2" to the offset designating circuit in response to these inputs, and outputs the register number "8" corresponding to "1000" which is an inverse value of value "0111" which is the binary notation of "7" to the register address designating circuit 218, then asserts the parallel access signal 8.

In the register address designating circuit 218, the inputted register number "8" is decoded, data is read out to the S2 bus 222 from the register RS, and data is read out from the register R7 to the S1 bus 221, by selecting a control line through which a bit string obtained by shifting the decoded result by one bit lower side is transferred, by the selector 14. Two data read out to the S1 bus 221 and S2 bus 222 are connected in the DD register 216, transferred as one 8-byte data to the operand access unit 120 through the DD bus 123 and stored in the internal data cache or external memory.

(5.7) "Operation of ENTER Instruction"

Processing of the ENTER instruction is the processing in which, as shown in FIG. 23, pushing of the frame pointer register R14 against a stack, transfer of the stack pointer register R15 to a frame pointer and subtraction of the stack pointer for securing the local variable area are combined with processing of the STM instruction.

In the ENTER instruction, when decomposing the instruction into a plurality of internal codes in the instruction decoding unit 112, before outputting the internal code which transfers the register content corresponding to the register list to the stack in the same way as the STM instruction, two internal codes which perform the following operations in the E stage 35 and A stage 33 are outputted.

For the first internal code, in the E stage 35, the frame pointer is transferred to the working register and simultaneously pushed against the stack. The stack pointer is transferred to the frame pointer. For the first internal code, in the A stage 33, an I size value transferred by a disp bus is inputted to an input latch 235. The ASP 234 is transferred by the IX bus. The ASP 234 value transferred is decremented by "4" by the address adder 21 and held in an output latch 219. The ASP 234 itself is decremented by "4". For the second internal code, in the A stage 33, the I size value which is the value of input latch 235 is transferred to the adder 234 through the IX bus and subtracted from the ASP 231. I size value of the input latch 235 is subtracted from the value of the output latch 219, and the value is designated as a memory address transferring the register content. First 2 bits (bits corresponding to the registers R14 and R15) of the register list designated by the instruction are reset in a mask circuit 27.

Processing in the E stage for the second internal code is the first register storing processing designated by the register list, as same as the first internal code. A reason for saving the frame pointer value into the working register by the first internal code is to restore the register contents of all registers to the state before executing the ENTER instruction, when errors are generated during execution of the ENTER instruction.

(5.8) "Operation of EXITD Instruction"

Processing of the EXITD instruction is, as shown in FIG. 24, the processing in which popping of the frame pointer register R14 from the stack, transfer of the frame pointer to the stack pointer register R15 and correction of the subroutine restore and stack pointer at the adjsp are combined with the LDM instruction processing.

In the EXITD instruction, when the instruction is decomposed into a plurality of internal codes in the instruction decoding unit 112, two internal codes for performing the following processings are added after the internal code which transfers the register content corresponding to the register list in the same way the LDM instruction.

For the first internal code, in the A stage 33, an adjsp value is transferred to the input latch 235 through the disp bus. In the E stage 35 for the first internal code, the frame pointer is transferred to the stack pointer. The frame pointer value is popped from the stack. For the second internal code, in the A stage 33, the adjsp value which is the content of the input latch 235 is transferred to the adder 234 through the IX bus and added to the ASP 231. In the E stage 35 for the second internal code, the subroutine operation is performed. The EXITD instruction is different from the LDM instruction in a point that, the last 2 bits (bits corresponding to the register R14 and R15) of the register list designated by the instruction are reset by the mask circuit 27.

(6) "External Access Operation"

(6.1) "Input/Output Signal Line"

Figure 38:
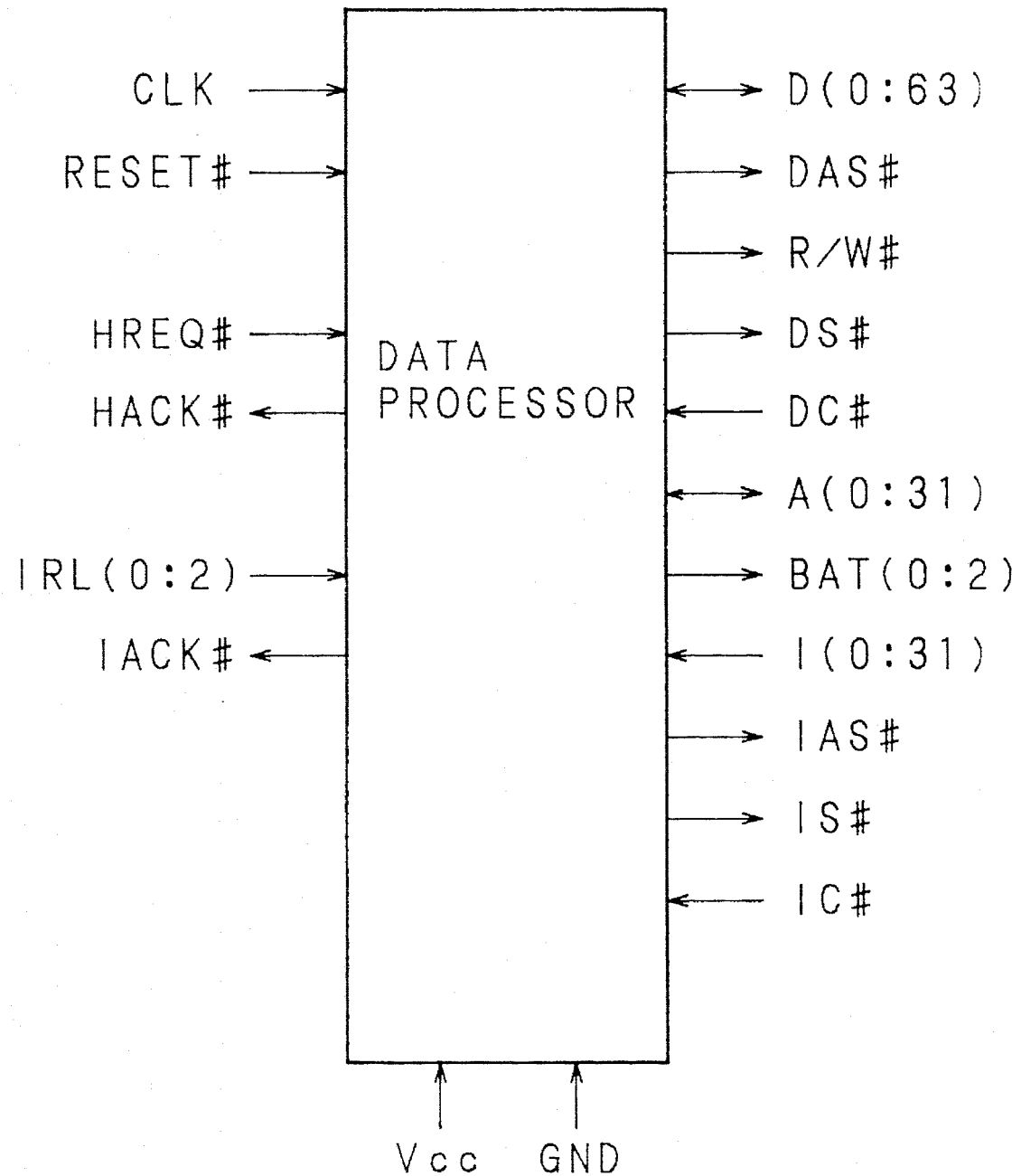
FIG. 38 is a schematic diagram showing input/output signals and respective pins thereof of a data processor of the present invention.

FIG. 38 is a schematic view showing the input/output signals of the data processor 100 of the present invention.

To and from the data processor 100 of the present invention, besides a power source Vcc and ground GND, 64 data pins, 32 address pins, 32 instruction pins and an input clock CLK, various control signals are inputted and outputted.

In both cases of instruction access and data access, the physical address is outputted to the address pins.

The CLK is an external input clock which has a same frequency as an operation clock of the data processor 100 of the present invention.

Data address strobe DAS# (# represents a low active signal) indicates that the data address outputted to the address pin is effective.

Read write R/W# discriminates whether a bus cycle at the data pin is the input or output.

Data strobe DS# indicates that the data processor 100 of the present invention has completed data input preparation, or that data is outputted from the data processor 100 of the present invention.

DC# is a signal which notices the data processor 100 of the present invention to complete a data access cycle.

BAT(0:2) shows the meaning of values of the address pin, data pin and instruction pin as shown in FIG. 38.

Instruction address strobe IAS# indicates that the instruction address outputted to the address pin is effective.

Instruction strobe IS# indicates that the data processor 100 of the present invention has completed instruction input preparation.

IC# is a signal which notices the data processor 100 of the present invention to allow completion of an instruction access cycle.

Hold request HREQ# is a signal which requests the bus to the data processor 100 of the present invention.

HACK# is a signal which indicates that the data processor 100 of the present invention has accepted the hold request HREQ# and given the bus to the other device.

IRL(0:2) is an external interruption request signal.

IACK# is a signal which indicates that the data processor 100 of the present invention has accepted the external interruption and performing an interruption vector access cycle.

(6.2) "Access of External Devices"

In an example of the system shown in FIG. 1 using the data processor 100 of the present invention, the data processor 100 of the present invention and the data caches 107, 108 are connected also at the BAT(0:2), DAS#, R/W#, DS# and DC# besides the data bus 102 connected to the data pins and the address bus 101 connected to the address pins. The data processor 100 of the present invention and the instruction cache 11 are connected also at the BAT(0:2), IAS#, IS# and IC# besides the instruction bus 103 and the address bus 101 connected to the instruction pins.

The CLK is a clock fed to the entire system and deciding the basic timing of the system.

At the time of bus access in a single access mode, the data access using the data bus 102 and the instruction access using the instruction bus 103 are performed respectivey for the external memory having a sufficient high speed, at the speed of once in two cycles of the external input clock CLK.

At the time of bus access in a burst access mode, the data access using the data bus 102 and the instruction access using the instruction bus 102 are performed respectively for the external memory having a sufficient high speed, at the speed of four times in five cycles of the external input clock CLK.

The address bus 101 is utilized for accessing both the data caches 107, 108 and the instruction cache 106.

(7) "Another Embodiment of the Present Invention"

As the abovementioned embodiment, explanation is given on an example as for four instructions of LDM instruction, STM instruction, ENTER instruction and EXITD instruction showing, by register list in instruction code,the number of operands to be transferred and register positions in which the respective operands are stored, however, it is also possible to process by decoding and decomposing plural data transfer instruction into a plurality of internal codes which shows transfer contents in instruction code by a first register number and a last register number of register in which operands to be transferred are stored, in only the case where a plurality of operands to be transferred are stored in registers having successive register numbers. this case, no priority encoder is needed.

And, it is also possible to process a plural data transfer instruction showing, in instruction code, a first register number and the number of operands of register in which operands to be transferred are stored.

Further, an instruction for transferring character string or an instruction for comparing character string is the one for processing a plurality of data existing in memory area, resulting in that there is no reliance between the respective data to be processed, thereby it is possible to operate by decoding and decomposing the instruction into a plurality of internal codes at the instruction decoding unit in the same way.

As described above in detail, according to the first invention of a data processor of the invention, at executing an instruction which loads data into a plurality of registers including a first register and a second register from predetermined memory area of a memory, since there is no need of preprocessing and after-processing for executing the above-mentioned instruction, as compared with a conventional data processor developing an instruction at a microprogram in the instruction execution control unit, it becomes possible to execute at high efficiency such as above-mentioned instruction which loads a plurality of data from memory to registers.

As above-mentioned, according to a second invention of a data processor of the invention, at executing an instruction for storing data into a predetermined memory area of an external memory from a plurality of registers including a first and second registers, since there is no need of preprocessing and after-processing for executing the above-mentioned data processor developing an instruction execution control unit, it becomes possible to execute at high efficiency such as instruction as above-mentioned instruction which stores a plurality of data into a memory from registers.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A data processor system including an external memory coupled to a data processor by an external bus, with the data processor executing a multifunctional transfer instruction, including an operation part and a register identification part, for transferring data from a plurality of storage locations in a designated memory area in the external memory to a plurality of registers in the data processor, said data processor comprising:

an instruction decoding unit, including a D-stage unit, a source/destination information updating unit, and a register identifying unit, with the D-stage unit, coupled to receive the operation part of the multifunctional instruction, for decodeing the operation part of said multifunctional transfer instruction to generate a decode result including first source information identifying a first storage location in said designated memory area, with said source/destination information updating unit, coupled to receive the register identification part of the multifunctional instruction and coupled to said D-stage unit to receive said first source information, for processing the register identification part of said multifunctional transfer instruction to determine the number of registers in said plurality, and with said register identifying unit, coupled to receive the register identification part of said multifunctional instruction, for processing the register identification part of said multifunctional instruction to generate a first register identifier, during a first processing period, indicating the identity of a first register in said plurality, and, if said number of registers is greater than one, with said register identifying unit for generating a second register identifier, identifying a second register in said plurality, and said source/destination information updating unit for generating second source information, identifying a second storage location in said designated memory area, during a second processing period, with said instruction decoding unit for outputting a first control code, during said first processing period, said first control code including said first source information and said first register identifier and for outputting a second control code, during said second processing period following said first processing period, said second control code including second source information and said second register identifier;

an instruction executing unit which is connected to the external memory through the external data bus and executes said multifunctional transfer instruction, and an instruction execution control unit, coupled to said instruction decoding unit to receive said first and second control codes and coupled to said instruction executing unit, which controls execution of instructions in said instruction executing unit, for controlling said instruction executing unit to transfer data from said first storage location in said plurality to said first register via the data bus in response to said first control code during said second processing period and for controlling said instruction executing unit to transfer data from said second storage location in said plurality to said second register via the data bus in response to said second control code during a third processing period following said second processing period.

2. A data processor system including an external memory coupled to a data processor by an external bus, with the data processor executing a multifunctional transfer instruction, including an operation part and a register identification part, for transferring data from a plurality of registers in the data processor to a plurality of storage locations in a designated memory area in the external memory, said data processor comprising:

an instruction decoding unit, including a D-stage unit, a source/destination information updating unit, and a register identifying unit, with the D-stage unit, coupled to receive the operation part of the multifunctional instruction, for decodeing the operation part of said multifunctional transfer instruction to generate a decode result including first destination information identifying a first storage location in said designated memory area, with said source/destination information updating unit, coupled to receive the register identification part of said multifunctional instruction and coupled to the D-stage unit to receive said first destination information, for processing the register identification part of said multifunctional transfer instruction to determine the number of registers in said plurality, and with said register identifying unit, coupled to receive the register identification part of said multifunctional instruction, for processing the register identification part of said multifunctional instruction to generate a first register identifier, during a first processing period, indicating the identity of a first register in said plurality, and, if said number of registers is greater than one, with said register identifying unit for generating a second register identifier, identifying a second register in said plurality, and said source/destination information updating unit for generating second destination information, identifying a second storage location in said designated memory area, during a second processing period, with said instruction decoding unit for outputting a first control code, during said first processing period, said first control code including said first destination information and said first register identifier and for outputting a second control code, during a second processing period following said first processing period, said second control code including second destination information and said second register identifier;

an instruction executing unit which is connected with the external memory through the external data bus and executes said multifunctional transfer instruction, an instruction execution control unit, coupled to said instruction decoding unit to receive said first and second control codes and coupled to said instruction executing unit, which controls execution of instructions in said instruction executing unit, for controlling said instruction executing unit to transfer data to said first storage location from said first register via the data bus in response to said first control code during said second processing period and for controlling said instruction executing unit to transfer data to said second storage location from said second register via the data bus during a third processing period following said second processing period.

* * * * *